US008282086B2

(12) United States Patent
Ueki

(10) Patent No.: US 8,282,086 B2
(45) Date of Patent: Oct. 9, 2012

(54) VIBRATION ISOLATOR

(75) Inventor: Akira Ueki, Kamakura (JP)

(73) Assignee: Bridgestone Corporation, Tokyo (JP)

( * ) Notice: Subject to any disclaimer, the term of this patent is extended or adjusted under 35 U.S.C. 154(b) by 1132 days.

(21) Appl. No.: 11/991,476

(22) PCT Filed: Sep. 6, 2006

(86) PCT No.: PCT/JP2006/317650
§ 371 (c)(1),
(2), (4) Date: Jul. 3, 2008

(87) PCT Pub. No.: WO2007/029739
PCT Pub. Date: Mar. 15, 2007

(65) Prior Publication Data
US 2009/0008195 A1 Jan. 8, 2009

(30) Foreign Application Priority Data

| Sep. 7, 2005 | (JP) | 2005-259808 |
| Sep. 7, 2005 | (JP) | 2005-259809 |
| Sep. 7, 2005 | (JP) | 2005-259813 |
| Oct. 27, 2005 | (JP) | 2005-312736 |

(51) Int. Cl.
*F16F 5/00* (2006.01)
*F16F 9/50* (2006.01)
(52) U.S. Cl. ............ 267/140.13; 188/281; 188/282.1; 188/282.6; 188/282.8; 188/288
(58) Field of Classification Search .......... 188/281, 188/282.1, 282.6, 282.8, 288; 267/140.13
See application file for complete search history.

(56) References Cited

U.S. PATENT DOCUMENTS

| 3,960,250 A * | 6/1976 | Wiater ............... 188/281 |
| 6,349,927 B1 * | 2/2002 | Suzuki ............ 267/140.13 |
| 6,439,554 B1 * | 8/2002 | Takashima et al. ...... 267/140.13 |
| 2004/0145125 A1 | 7/2004 | Satori et al. |
| 2005/0218570 A1 | 10/2005 | Ueki |

FOREIGN PATENT DOCUMENTS
EP        1 498 637 A1    1/2005
(Continued)

*Primary Examiner* — Bradley King
*Assistant Examiner* — Mahbubur Rashid
(74) *Attorney, Agent, or Firm* — Oliff & Berridge, PLC

(57) ABSTRACT

There is provided a vibration isolator in which a restriction passage for causing a main fluid chamber and a sub-fluid chamber to communicate with each other is changed over to one of a first restriction passage and a second restriction passage according to a change in the frequency of vibrations in a short period of time, and the size of the isolator is made small efficiently. A plunger member 78 closes an orifice opening 74 when being moved to a closing position against the urging force of a coil spring 90 by the fluid pressure in a pressurization space 130, and opens the orifice opening 74 when being returned to an opening position by the urging force of the coil spring 90. For the orifice opening 74, the opening ratio R between the transverse opening width along the axial direction and the longitudinal opening width along the circumferential direction is set in the range of $2 \leq R \leq 25$, further preferably $5 \leq R \leq 20$. Thereby, the longitudinal opening width can be made sufficiently small while an opening area necessary for the orifice opening 74 is secured. Therefore, the distance between the opening position and the closing position of the plunger member 78 can be shortened according to the longitudinal opening width.

13 Claims, 10 Drawing Sheets

FOREIGN PATENT DOCUMENTS

| | | |
|---|---|---|
| JP | A-04-236833 | 8/1992 |
| JP | A-04-272532 | 9/1992 |
| JP | A-04-272533 | 9/1992 |
| JP | U-06-054940 | 7/1994 |
| JP | A-07-310778 | 11/1995 |
| JP | A-2000-310274 | 11/2000 |
| JP | A-2003-004091 | 1/2003 |
| WO | WO 2004/081408 A1 | 9/2004 |

* cited by examiner

FIG. 6
(A)
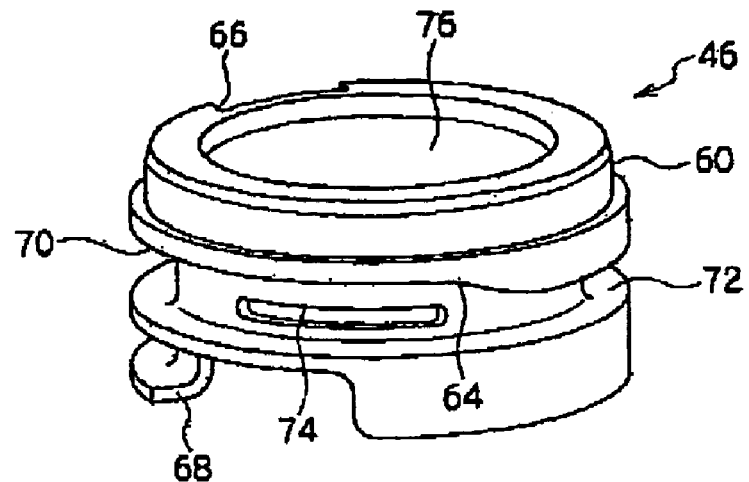
(B)
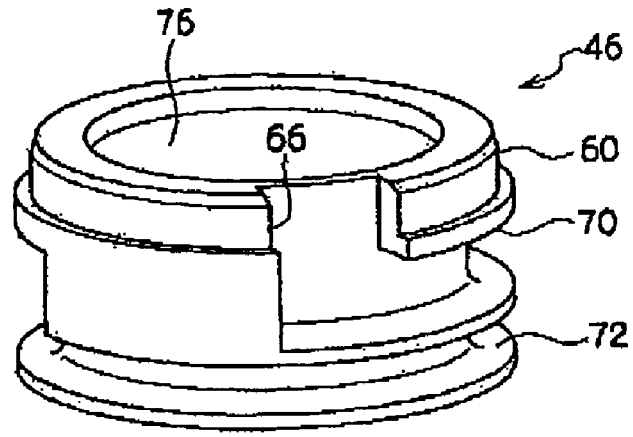
(C)
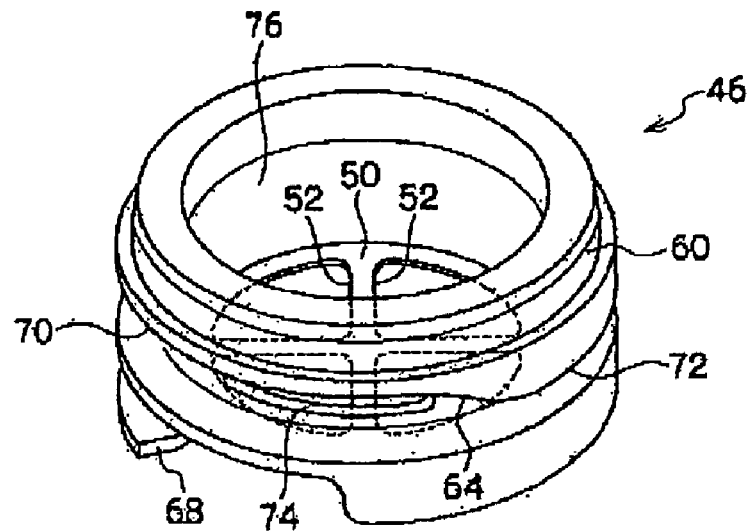

FIG. 8
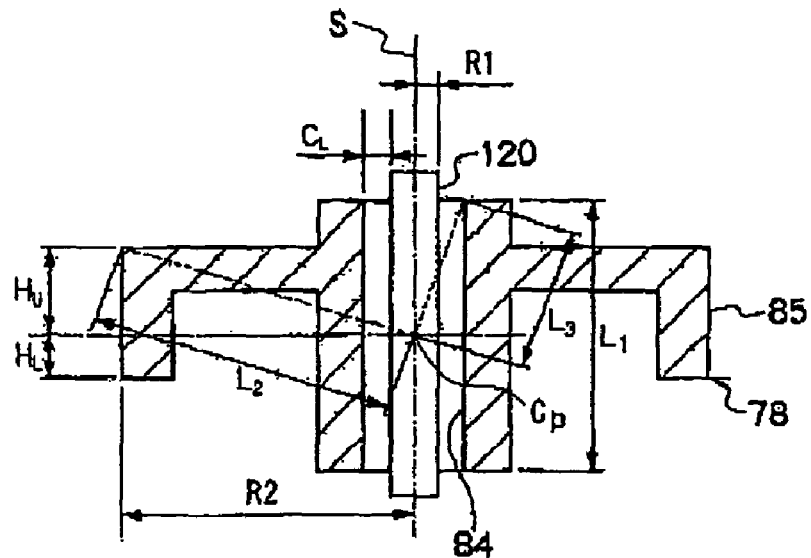
(A)
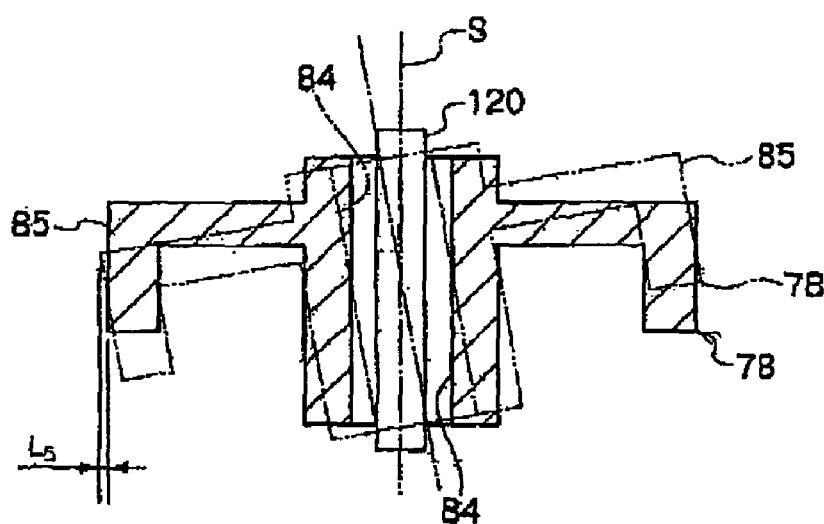
(B)
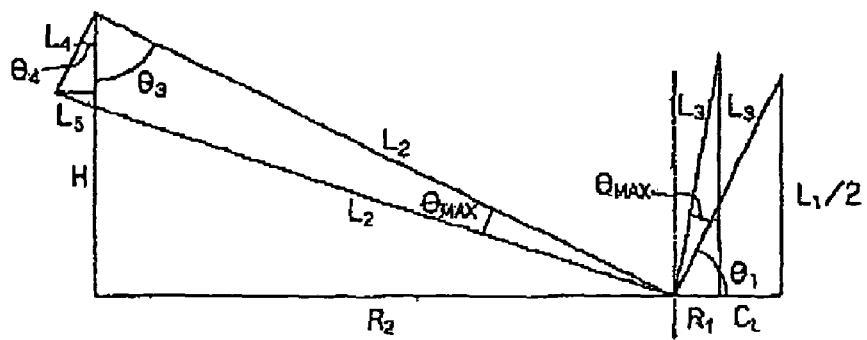
(C)

VIBRATION ISOLATOR

TECHNICAL FIELD

The present invention relates to a fluid-filled vibration isolator for preventing the transmission of vibrations from a vibration-producing member and, more particularly, to a vibration isolator used suitably as an engine mount for an automobile or the like.

RELATED ART

For example, on a vehicle such as a passenger car, a vibration isolator serving as an engine mount is disposed between an engine, which is a vibration-producing part, and a vehicle body, which is a vibration-receiving part. The vibration isolator is constructed so as to absorb vibrations produced from the engine and thereby to prevent the vibrations from being transmitted to the vehicle body side.

As a vibration isolator of this type, there has been known a vibration isolator in which a main fluid chamber and a sub-fluid chamber and a plurality of orifices causing the two chambers to communicate with each other are provided to accommodate vibrations in a wide range of frequencies, and the plurality of orifices are opened and closed selectively by a valve mechanism driven by an electromagnetic solenoid or the like so that the main fluid chamber and the sub-fluid chamber are caused to communicate with each other by one of the orifices according to the frequency of input vibrations.

That is to say, for such a vibration isolator, not only an electrical electromagnetic solenoid or the like for controlling the opened/closed state of orifice to change over the passage of fluid by the plurality of orifices is needed but also, from the viewpoint of construction, a controller for operating the electromagnetic solenoid or the like based on the frequency etc. of input vibrations to change over the orifices is needed.

A problem with the conventional vibration isolator is that the electromagnetic solenoid and controller are relatively expensive, and these elements remarkably complicates the construction of vibration isolator and makes the work for installing the vibration isolator on the vehicle troublesome.

In view of the above-described problems, the inventor of this application has disclosed, in Patent Document 1, a vibration isolator in which the main fluid chamber and the sub-fluid chamber are caused to communicate with each other via a shake orifice and an idle orifice, and a plunger member arranged in a cylinder space that forms a part of the idle orifice and communicates with the sub-fluid chamber is moved to a closing position at which the idle orifice is closed by the fluid pressure in the main fluid chamber when shake vibrations are input and is moved to an opening position at which the idle orifice is opened by the urging force of a coil spring when idle vibrations are input.

For the vibration isolator described in Patent Document 1, a partitioning member for partitioning the space in an external cylinder into the main fluid chamber and the sub-fluid chamber is provided, and the plunger member is arranged in a cylinder chamber formed on the inner periphery side of this partitioning member so as to be movable in the axial direction. When the plunger member moves to the closing position, the plunger member closes an orifice opening that is open facing to the cylinder chamber to make the idle orifice in a closed state, and when the plunger member returns to the opening position, the plunger member separates from the orifice opening to make the idle orifice in an opened state.

Also, for the vibration isolator described in Patent Document 1, a guide shaft projecting downward along the axis of isolator is formed integrally in the central part on the lower surface of the plunger member, and a shaft accommodating hole in which the guide shaft is slidably inserted is formed in a partition part that divides an orifice space from the sub-fluid chamber. Thereby, the plunger member is guided so as to move along the opening/closing direction, and also the occurrence of eccentricity and tilt of the plunger member with respect to the axis is restricted.

For vibration isolator described in Patent Document 1, the plunger member cannot be moved smoothly in the opening/closing direction unless a clearance having a predetermined width is provided between the inner peripheral surface of the shaft accommodating hole and the outer peripheral surface of the guide shaft.

That is to say, in each part of the shaft accommodating hole and the guide shaft, a dimensional error is produced inevitably, and the fluid pressure is not necessarily exerted on the plunger member uniformly so that moment that tends to tilt the plunger member with respect to the guide shaft is produced. To prevent the movement resistance of plunger member from becoming excessive due to the influence of these factors, the clearance having a predetermined width is required to be provided between the inner peripheral surface of the shaft accommodating hole and the outer peripheral surface of the guide shaft.

[Patent Document 1] WO2004/081408

For the vibration isolator described in Patent Document 1, the aspect ratio of the orifice opening formed in the inner peripheral surface of the partitioning member so as to face to the cylinder chamber is not subject to any special restriction, and the opening width (longitudinal opening width) of the orifice opening along the longitudinal direction coinciding with the movement direction (opening/closing direction) of the member in the cylinder chamber is relatively great. Therefore, in order to surely open or close the orifice opening, the movable range from the opening position to the closing position of the plunger member must be made wider than the longitudinal opening width of the orifice opening.

However, the vibration isolator described in Patent Document 1 has a problem in that as the movable range of the plunger member increases, the dimension along the opening/closing direction of the partitioning member by which the cylinder chamber is formed must be increased, and the increase in dimension of the partitioning member inevitably increases the size of the whole of isolator.

Also, if the longitudinal opening width of the orifice opening increases, the displacement of the plunger member required when the plunger member opens or closes the orifice opening, that is, the distance from the opening position to the closing position also increases. Therefore, there also arises a problem in that the speed of response required to change the state of idle orifice from one to the other of the opened state and the closed state when the input vibrations changes from the idle vibrations to the shake vibrations and vice versa becomes slow.

In addition, if the relationship between the clearance (inner periphery side clearance) between the inner peripheral surface of the shaft accommodating hole and the outer peripheral surface of the guide shaft and the clearance (outer periphery side clearance) between the outer peripheral surface of the plunger member and the inner peripheral surface of the cylinder chamber is improper, when the plunger member tilts with respect to the guide shaft, the outer peripheral surface of the guide shaft does not come into contact with the inner peripheral surface of the shaft accommodating hole, and only the outer peripheral surface of the plunger member comes into contact with the inner peripheral surface of the cylinder chamber. Also, an excessive frictional force is generated between the outer peripheral surface of the plunger member and the inner peripheral surface of the cylinder chamber. Therefore, it is possible that the plunger member will not move normally to a position (opening position or closing position) corresponding to the frequency of input vibrations due to the influence of this frictional force.

Moreover, for the vibration isolator described in Patent Document 1, in the outer peripheral surface of the partitioning member for partitioning the liquid chamber space formed on the inner periphery side of the external cylinder into the main fluid chamber, in which an elastic body is a part of the partition, and the sub-fluid chamber, in which a diaphragm is a part of the partition, two independent orifices (shake orifice and idle orifice) are formed. Therefore, the construction of the partitioning member is complicated, and it is difficult to decrease the sizes along the axial direction and the radial direction of the partitioning member.

Thereupon, for the vibration isolator described in Patent Document 1, the partitioning member is relatively large in size, so that the size of the whole of isolator undesirably becomes large.

Also, for the vibration isolator described in Patent Document 1, the coil spring for urging the plunger member to the opening position is arranged in the orifice space in a compressed state. One end turn part (bearing surface) of the coil spring is pressed against the plunger member, and the other end turn part (bearing surface) thereof is pressed against the partition part that divides the orifice space from the sub-fluid chamber in the isolator.

It is known that since the coil spring is configured so that the paired end turn parts each usually have an asymmetric shape with respect to the axis, a transverse force along the direction perpendicular to the axis is generated at the time of deformation. Therefore, for the vibration isolator described in Patent Document 1, if the coil spring repeats deformation in the compression and tension direction at the vibration input time, the whole of coil spring is moved along the radial direction by the influence of transverse force. As a result, a positional shift (eccentricity) of the coil spring with respect to a predetermined assembly position occurs, or one end turn part moves relatively along the direction perpendicular to the axis with respect to the other end turn part, so that it is possible that the coil spring will tilt with respect to the opening/closing direction of the plunger member.

If the coil spring becomes in an eccentric state or a tilted state in this manner, for the vibration isolator described in Patent Document 1, the relationship between deformation and restoring force (spring constant) of the coil spring becomes different from the design value, or the nonlinear characteristics of the coil spring become intense, so that it is possible that the plunger member will not move normally to a position (opening position or closing position) corresponding to the frequency of input vibrations.

Considering the above-described fact, a main object of the present invention is to provide a vibration isolator in which a restriction passage causing a main fluid chamber and a sub-fluid chamber to communicate with each other can be changed over to one of a first restriction passage and a second restriction passage according to the change in vibration frequency in a short period of time, and the size of isolator can be decreased efficiently.

Another object of the present invention is to provide a vibration isolator in which a restriction passage causing a main fluid chamber and a sub-fluid chamber to communicate with each other can be changed over to one of a first restriction passage and a second restriction passage by a plunger member that moves to a position corresponding to the frequency of input vibrations in a cylinder chamber, and the movement resistance of the plunger member can surely be prevented from being increased by the contact of the outer peripheral surface of the plunger member with the inner peripheral surface of the cylinder chamber.

Still another object of the present invention is to provide a vibration isolator in which a restriction passage causing a main fluid chamber and a sub-fluid chamber to communicate with each other can be changed over to one of a first restriction passage and a second restriction passage according to a vibration frequency, and the size of isolator can be decreased efficiently.

Yet another object of the present invention is to provide a vibration isolator in which the end turn part of a coil spring for urging a plunger member to the opening position side of orifice opening can be positioned at a predetermined assembly position accurately, and the coil spring can surely be prevented from being displaced from the assembly position.

DISCLOSURE OF THE INVENTION

To achieve the above object, the vibration isolator according to claim 1 of the present invention includes a first attaching member connected to one of a vibration-producing part and a vibration-receiving part; a second attaching member connected to the other of the vibration-producing part and the vibration-receiving part; an elastic body arranged between the vibration-producing part and the vibration-receiving part; a main fluid chamber which is filled with a fluid with the elastic body being used as a part of partition and the internal volume of which changes along with the elastic deformation of the elastic body; a sub-fluid chamber which is filled with the fluid and the internal volume of which is capable of increasing and decreasing; a first restriction passage which causes the main fluid chamber and the sub-fluid chamber to communicate with each other; a second restriction passage which causes the main fluid chamber and the sub-fluid chamber to communicate with each other and has fluid flow resistance smaller than that of the first restriction passage; a cylinder chamber which is provided between the main fluid chamber and the sub-fluid chamber and is filled with the fluid; a plunger member which divides the cylinder chamber into an orifice space which forms a part of the second restriction passage and communicates with the sub-fluid chamber and a pressurization space isolated from the second restriction passage, and is capable of moving between a predetermined opening position and closing position along the expanding/contracting direction of the orifice space and the pressurization space; an orifice opening which is provided so as to face to the orifice space to cause the orifice space to communicate with other parts in the second restriction passage; an urging member for urging the plunger member to the opening position side to decrease the pressurization space; a fluid pressure releasing path for allowing the fluid in the pressurization space to flow out into the orifice space or the sub-fluid chamber when the plunger member is returned to the opening position by the urging force of the urging member; and a check valve which is arranged between the main fluid chamber and the pressurization space and is capable of allowing the fluid to flow out only in one direction between the main fluid chamber and the pressurization space along with a fluid pressure change in the main fluid chamber, and is characterized in that the width of a first opening along the opening longitudinal direction of the orifice opening in parallel with the expanding/contracting direction is set so as to be narrower than the width of a second opening along the opening transverse direction intersecting with the opening longitudinal direction, and the plunger member closes the orifice opening when being moved to the closing position against the urging force of the urging member by the fluid pressure in the pressurization space, and opens the orifice opening when being returned to the opening position by the urging force of the urging member.

The operation of the vibration isolator according to claim 1 is explained below.

In this vibration isolator, basically, when vibrations are transmitted to either one of the first and second attaching members, the elastic body arranged between the first and second attaching members is elastically deformed, so that vibrations are absorbed by the vibration absorbing action based on the internal friction etc. of the elastic body, and thereby vibrations transmitted to the vibration-receiving part side is reduced.

Also, in this vibration isolator, the main fluid chamber and the sub-fluid chamber are caused to communicate with each other by the first restriction passage, and also when the orifice opening is in an opened state, the main fluid chamber and the sub-fluid chamber are also caused to communicate with each other by the second restriction passage having fluid flow resistance smaller than that of the first restriction passage.

Further, in the vibration isolator according to claim 1, when the plunger member at the opening position is moved to the closing position by the pressure of fluid supplied from the main fluid chamber into the pressurization space through the check valve, the fluid flows back and forth between the main fluid chamber and the sub-fluid chamber passing through only the first restriction passage along with the elastic deformation of the elastic body, and when the plunger member at the closing position is returned to the opening position by the urging force of the urging member, both of the first and second restriction passages become in an opened state, and the fluid flows back and forth between the main fluid chamber and the sub-fluid chamber preferentially passing through the second restriction passage having relatively small fluid flow resistance.

That is to say, in the vibration isolator according to claim 1, in the case where vibrations having a relatively low frequency and large amplitude (hereinafter, referred to as "low-frequency zone vibrations") are input, the elastic body is elastically deformed by the low-frequency zone vibrations, so that a relatively large change in fluid pressure occurs in the main fluid chamber. Also, when the fluid pressure in the main fluid chamber changes periodically, the fluid flows from the main fluid chamber into the pressurization space through the check valve, or contrarily, the fluid flows out from the pressurization space into the main fluid chamber via the check valve, so that the fluid pressure in the pressurization space also reaches an equilibrium pressure substantially in equilibrium with the fluid pressure (the maximum value or the minimum value) in the main fluid chamber.

At this time, if the urging force of the urging member is set so as to be smaller than the value corresponding to the equilibrium pressure in the pressurization space, the plunger member moves intermittently from the opening position to the closing position side against the urging force of the urging member, and is held at the closing position by the fluid pressure in the pressurization space.

Therefore, if the fluid flow resistance in the first restriction passage is set (tuned) so as to correspond to the frequency and amplitude of the low-frequency zone vibrations, a resonance phenomenon (liquid column resonance) takes place on the fluid that flows back and forth between the main fluid chamber and the sub-fluid chamber through the first restriction passage, so that the low-frequency zone vibrations can be absorbed especially effectively by the action of the liquid column resonance.

Also, in the vibration isolator according to claim 1, in the case where vibrations having a relatively high frequency and small amplitude (hereinafter, referred to as "high-frequency zone vibrations") are input, the elastic body is elastically deformed by the high-frequency zone vibrations, and also a relatively small change in fluid pressure occurs in the main fluid chamber. Therefore, in this case as well, when the fluid pressure in the main fluid chamber rises periodically, the fluid flows from the main fluid chamber into the pressurization space through the check valve, or the fluid flows out from the pressurization space into the main fluid chamber, so that the fluid pressure in the pressurization space reaches the equilibrium pressure substantially in equilibrium with the fluid pressure (the maximum value or the minimum value) in the main fluid chamber.

At this time, if the urging force of the urging member is set so as to be larger than the value corresponding to the equilibrium pressure in the pressurization space, the plunger member at the opening position is held at the opening position by the urging force of the urging member, and also the plunger member at the closing position is moved (returned) from the closing position to the opening position by the urging force of the urging member.

Therefore, in this vibration isolator, at the time of input of high-frequency zone vibrations, along with the elastic deformation of the elastic body, the fluid flows back and forth between the main fluid chamber and the sub-fluid chamber preferentially passing through the second restriction passage having fluid flow resistance smaller than that of the first restriction passage. Therefore, the input vibrations can be absorbed by the viscous resistance and pressure loss of the fluid flowing in the second restriction passage, so that the high-frequency zone vibrations can be reduced effectively.

At this time, if the fluid flow resistance of the second restriction passage is set (tuned) so as to correspond to the frequency and amplitude of the high-frequency zone vibrations, a resonance phenomenon (liquid column resonance) takes place on the fluid that flows back and forth between the main fluid chamber and the sub-fluid chamber through the second restriction passage, so that the high-frequency zone vibrations can be absorbed especially effectively by the action of the liquid column resonance.

As the result, according to the vibration isolator described in claim 1, the restriction passage that causes the main fluid chamber and the sub-fluid chamber to communicate with each other can be changed over automatically to either one of the first and second restriction passages according to a change in the frequency of input vibrations by using the fluid pressure change in the main fluid chamber as a driving force for the plunger member without the use of a valve mechanism that is operated by receiving control from the outside using an electromagnetic solenoid, a pneumatic solenoid, or the like and power supply.

Also, in this vibration isolator, since the width of the first opening along the opening longitudinal direction of the orifice opening in parallel with the expanding/contracting direction is set so as to be narrower than the width of the second opening along the opening transverse direction intersecting with the opening longitudinal direction, the width of the first opening can be made sufficiently small while an opening area necessary for the orifice opening is secured. Therefore, the distance between the opening position at which the plunger member opens the orifice opening and the closing position at which the plunger member closes the orifice opening can be shortened according to the width of the first opening.

As the result, according to the vibration isolator described in claim 1, the dimension of the cylinder chamber in which the plunger member is arranged so as to be movable along the expanding/contracting direction can be made small as compared with the case where the width of the first opening of the orifice opening is almost equal to or wider than the width of the second opening, so that the dimension along the expanding/contracting direction of the whole of isolator can be reduced efficiently, and the displacement of the plunger member required when the plunger member opens and closes the orifice opening can also be reduced. Therefore, when the input vibrations are changed from low-frequency zone vibrations to high-frequency zone vibrations and vice versa, the speed of response of the isolator required for changing the second restriction passage from one to the other of an opened state and a closed state can be reduced.

The vibration isolator according to claim 2 of the present invention is characterized in that, in the vibration isolator described in claim 1, an edge part of the outer peripheral surface of the plunger member, which is close to the closing position along the expanding/contracting direction, extends substantially in parallel with the opening transverse direction in a state in which the plunger member is at the opening position.

The vibration isolator according to claim 3 of the present invention is characterized in that, in the vibration isolator described in claim 1, the fluid flow resistance in the orifice opening is smaller than the fluid flow resistance in an upstream-side portion and a downstream-side portion of the orifice opening of the second restriction passage.

To achieve another object, the vibration isolator according to claim 4 of the present invention is characterized in that, in the vibration isolator described in claim 1, the vibration isolator further includes a shaft accommodating hole provided in the plunger member so as to penetrate in the expanding/contracting direction; and a holder member for a valve element of the check valve, which is provided with a guide shaft inserted in the shaft accommodating hole so as to be relatively slidable, and when the maximum tilt angle of the plunger member with respect to the expanding/contracting direction, which is calculated according to a difference between the inside diameter of the shaft accommodating hole and the outside diameter of the guide shaft, is taken as $\theta_{MAX}$, a difference $D_{MIN}$ between the inside diameter of the cylinder chamber and the outside diameter of the plunger member is set so that any portion on the outer peripheral surface of the plunger member keeps a clearance of 0 mm or larger between the outer peripheral surface of the plunger member and the inner peripheral surface of the cylinder chamber in a state in which the plunger member tilts at the maximum tilt angle $\theta_{MAX}$.

In the vibration isolator according to claim 4, since the shaft accommodating hole is provided in the plunger member so as to penetrate in the expanding/contracting direction, and the guide shaft of the holder member for the valve element of the check valve is inserted in the shaft accommodating hole so as to be slidable relatively, the occurrence of eccentricity and tilt of the plunger member, which moves in the expanding/contracting direction, with respect to the axis can be restricted. Therefore, when the frequency of input vibrations changes, the plunger member can move smoothly to the opening/closing position side or the closing position side.

Further, in the vibration isolator according to claim 4, when the maximum tilt angle of the plunger member with respect to the expanding/contracting direction, which is calculated according to the difference between the inside diameter of the shaft accommodating hole and the outside diameter of the guide shaft, is taken as $\theta_{MAX}$, the difference $D_{MIN}$ between the inside diameter of the cylinder chamber and the outside diameter of the plunger member is set so that any portion on the outer peripheral surface of the plunger member keeps a clearance of 0 mm or larger between the outer peripheral surface of the plunger member and the inner peripheral surface of the cylinder chamber in a state in which the plunger member tilts at the maximum tilt angle $\theta_{MAX}$. Therefore, when the plunger member tilts at the maximum tilt angle $\theta_{MAX}$ with respect to the guide shaft (the expanding/contracting direction), a state in which the inner peripheral surface of the shaft accommodating hole in the plunger member comes into contact with the outer peripheral surface of the guide rod is formed. However, the clearance of 0 mm or larger is surely kept between any portion on the outer peripheral surface of the plunger member and the inner peripheral surface of the cylinder chamber, so that the contact of the outer peripheral surface of the plunger member with the inner peripheral surface of the cylinder chamber in a pressurized state is prevented.

If the outer peripheral surface of the plunger member comes into contact with the inner peripheral surface of the cylinder chamber in a pressurized state, the contact area is large as compared with the contact area between the inner peripheral surface of the shaft accommodating hole and the outer peripheral surface of the guide rod, so that the frictional resistance is also relatively large. However, even if the inner peripheral surface of the shaft accommodating hole comes into contact with the outer peripheral surface of the guide rod in a pressurized state, the contact area between the inner peripheral surface of the shaft accommodating hole and the outer peripheral surface of the guide rod is relatively small, and the frictional resistance between the inner peripheral surface of the shaft accommodating hole and the outer peripheral surface of the guide rod is relatively small because the frictional resistance can be kept low by appropriately selecting the molding material (shaft accommodating material) for the element.

As the result, according to the vibration isolator described in claim 4, even when the plunger member tilts with respect to the guide shaft, the development of frictional resistance between the outer peripheral surface of the plunger member and the inner peripheral surface of the cylinder chamber is prevented substantially, and the increase in movement resistance of the plunger member along the expanding/contracting direction can be restrained effectively. Therefore, the plunger member can be prevented from not moving normally to a position corresponding to the frequency of input vibrations (opening position or closing position).

To achieve still another object, the vibration isolator according to claim 5 of the present invention is characterized in that, in the vibration isolator described in claim 1, a part on the main fluid chamber side of the first restriction passage is formed as a common orifice part forming a part of the second restriction passage, and the orifice opening communicating with the orifice space is formed in the boundary part between the common orifice part and a dedicated orifice part, which is another part of the first restriction passage.

In this vibration isolator, like the vibration isolator according to claim 1, in the case where vibrations having a relatively low frequency and large amplitude (hereinafter, referred to as "low-frequency zone vibrations") are input, the elastic body is elastically deformed by the low-frequency zone vibrations, so that a relatively large change in fluid pressure occurs in the main fluid chamber. Also, when the fluid pressure in the main fluid chamber changes periodically, the fluid flows from the main fluid chamber into the pressurization space through the check valve, or the fluid flows out from the pressurization space into the main fluid chamber, so that the fluid pressure in the pressurization space also reaches the equilibrium pressure substantially in equilibrium with the fluid pressure (the maximum value or the minimum value) in the main fluid chamber.

At this time, if the urging force of the urging member is set so as to be smaller than the value corresponding to the equilibrium pressure in the pressurization space, the plunger member moves intermittently from the opening position to the closing position side against the urging force of the urging member, and is held at the closing position by the fluid pressure in the pressurization space.

Therefore, if the fluid flow resistance in the first restriction passage is set (tuned) so as to correspond to the frequency and amplitude of the low-frequency zone vibrations, a resonance phenomenon (liquid column resonance) takes place on the fluid that flows back and forth between the main fluid chamber and the sub-fluid chamber through the first restriction passage, so that the low-frequency zone vibrations can be absorbed especially effectively by the action of the liquid column resonance.

Also, in this vibration isolator, in the case where vibrations having a relatively high frequency and small amplitude (hereinafter, referred to as "high-frequency zone vibrations") are input, the elastic body is elastically deformed by the high-frequency zone vibrations, and also a relatively small change in fluid pressure occurs in the main fluid chamber. Therefore, in this case as well, when the fluid pressure in the main fluid chamber changes periodically, the fluid flows from the main fluid chamber into the liquid pressure space through the check valve, or the fluid flows out from the liquid pressure space into the main fluid chamber, so that the fluid pressure in the liquid pressure space also reaches the equilibrium pressure substantially in equilibrium with the fluid pressure (the maximum value or the minimum value) in the main fluid chamber.

At this time, if the urging force of the urging member is set so as to be larger than the value corresponding to the equilibrium pressure in the liquid pressure space, the plunger member at the opening position is held at the opening position by the urging force of the urging member, and also the plunger member at the closing position is moved (returned) from the closing position to the opening position by the urging force of the urging member.

Therefore, in this vibration isolator as well, at the time of input of high-frequency zone vibrations along with the elastic deformation of the rubber elastic body, the fluid flows back and forth between the main fluid chamber and the sub-fluid chamber preferentially passing through the second restriction passage having fluid flow resistance smaller than that of the first restriction passage. Therefore, if the fluid flow resistance in the second restriction passage is set (tuned) so as to correspond to the frequency and amplitude of the high-frequency zone vibrations, a resonance phenomenon (liquid column resonance) takes place on the fluid that flows back and forth between the main fluid chamber and the sub-fluid chamber through the second restriction passage, so that the high-frequency zone vibrations can be absorbed especially effectively by the action of the liquid column resonance.

As the result, according to the vibration isolator described in claim 5, the restriction passage that causes the main fluid chamber and the sub-fluid chamber to communicate with each other can be changed over to either one of the first and second restriction passages according to the frequency of input vibrations by using the fluid pressure change in the main fluid chamber as a driving force without the use of a valve mechanism that is operated by receiving control from the outside using an electromagnetic solenoid, a pneumatic solenoid, or the like and power supply. Also, since a part on the main fluid chamber side of the first restriction passage is used as the common orifice part forming a part of the second restriction passage, a part of the second restriction passage can be formed by the common orifice part in the first restriction passage, so that the two restriction passages of the first restriction passage and the second restriction passage can be arranged efficiently in a limited space in the isolator, and thereby the size of isolator can be made small efficiently.

Also, the vibration isolator according to claim 6 of the present invention is characterized in that, in the vibration isolator described in claim 5, the cross-sectional area of the common orifice part in the first restriction passage is equal to or larger than the cross-sectional area of the dedicated orifice part.

The vibration isolator according to claim 7 of the present invention is characterized in that, in the vibration isolator described in claim 5 or 6, the fluid flow resistance in the orifice opening is smaller than the fluid flow resistance in the common orifice part.

The vibration isolator according to claim 8 of the present invention is characterized in that, in the vibration isolator described in any one of claims 5 to 7, the cylinder chamber is provided on the inner periphery side of the first restriction passage in the partitioning member.

The vibration isolator according to claim 9 of the present invention is characterized in that, in the vibration isolator described in claim 1, the vibration isolator further includes a coil spring for urging the plunger member to the opening position side on which the pressurization space is decreased; and a receiving part which engages with at least one end turn part of the coil spring to restrict the movement of the end turn part along the radial direction, and the plunger member closes the orifice opening when being moved to the closing position against the urging force of the coil spring by the fluid pressure in the pressurization space, and opens the orifice opening when being returned to the opening position by the urging force of the coil spring.

In the vibration isolator according to claim 9, in particular, if the end turn part of the coil spring is engaged with the receiving part by providing the receiving part which engages with at least one end turn part of the coil spring for urging the plunger member to the opening position to restrict the movement of the end turn part along the radial direction, the end turn part can be positioned accurately so as to coincide with the receiving part along the direction perpendicular to the axis, and also the end turn part can be inhibited from being moved along the direction perpendicular to the axis by the receiving part. Therefore, if the receiving part is provided at a predetermined assembly position in advance, the end turn part of the coil spring engaging with the receiving part can be positioned accurately at the predetermined assembly position. Also, even if the deformation in the compression and tension direction of the coil spring is repeated at the vibration input time, the coil spring can be prevented from being displaced from the predetermined assembly position and from tilting with respect to the expanding/contracting direction of the plunger member.

As described above, according to the vibration isolator in accordance with the present invention, the restriction passage causing the main fluid chamber and the sub-fluid chamber to communicate with each other can be changed over to one of the first restriction passage and the second restriction passage according to the change in vibration frequency in a short period of time, and the size of isolator can be decreased efficiently. In addition, the restriction passage causing the main fluid chamber and the sub-fluid chamber to communicate with each other can be changed over to one of the first restriction passage and the second restriction passage by the plunger member that moves to a position corresponding to the frequency of input vibrations in the cylinder chamber, and the movement resistance of the plunger member can surely be prevented from being increased by the contact of the outer peripheral surface of the plunger member with the inner peripheral surface of the cylinder chamber.

BRIEF DESCRIPTION OF THE DRAWINGS

FIG. 6 is a perspective view showing a configuration of an orifice member in the vibration isolator shown in FIG. 1;

FIGS. 8(A) and 8(B) are side sectional views schematically showing a plunger member 78 and a guide rod 120 in the vibration isolator shown in FIG. 1, and FIG. 8(C) is a supplementary explanatory view of a geometric computational expression for the seal surface of a plunger member to keep a clearance of 0 mm or larger between the seal surface and the inner peripheral surface of a cylinder chamber;

Figure 1:
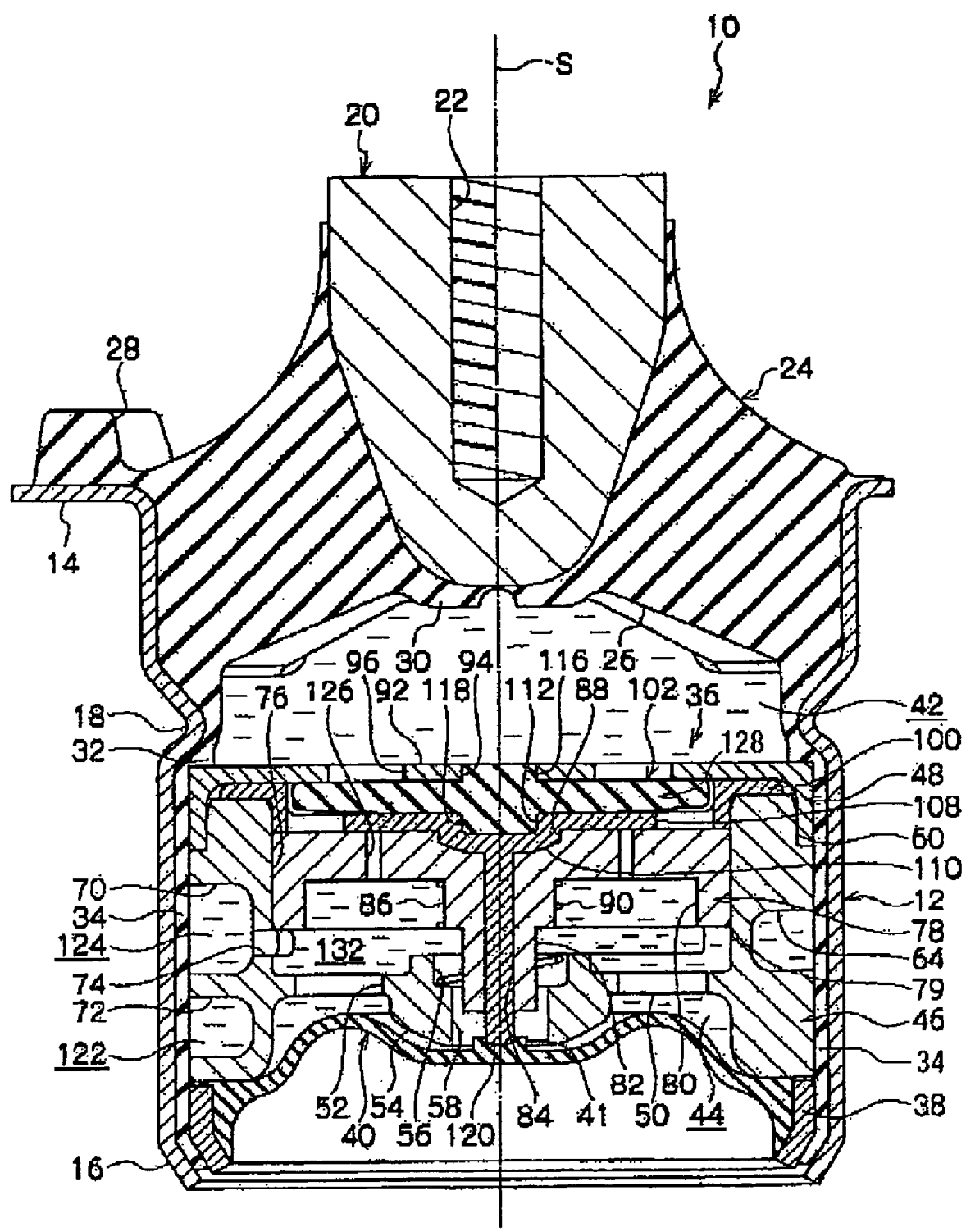
FIG. 1 is a sectional view along the axial direction showing a configuration of a vibration isolator in accordance with an embodiment of the present invention, showing a state in which a plunger member is at an opening position.

DESCRIPTION OF SYMBOLS 10, 150 vibration isolator
12 external cylinder member (first attaching member)
20 attaching member (second attaching member)
24 rubber elastic body (elastic body)
36 partitioning member (support member)
40 diaphragm
42 main fluid chamber
44 sub-fluid chamber
56 receiving seat
56E edge part
56S far-side end part
56T taper part
70 common orifice part
72 dedicated orifice part
74 orifice opening
76 cylinder chamber
78, 162 plunger member
79 edge part
84 shaft accommodating hole
85 seal surface
86 seat receiving protrusion
86S base end part
86T taper part
90, 160 coil spring (urging member)
100 holder member
102, 158 valve element
120 guide rod
121 ceramic layer
122 shake orifice (first restriction passage)
124 idle orifice (second restriction passage)
126 fluid pressure releasing path
128 check valve
130 pressurization space
132 orifice space
134 lower-side bearing surface
136, 140 end turn part
138 upper-side bearing surface
152 valve seat opening
154 flow opening
164 plunger opening
166 auxiliary opening
DI receiving seat inside diameter
DO end turn part outside diameter
DT seat receiving protrusion outside diameter

BEST MODE FOR CARRYING OUT THE INVENTION

Vibration isolators in accordance with embodiments of the present invention will now be described with reference to the accompanying drawings. In the figures, symbol S denotes the axis of the isolator, and the following explanation is given with the direction along this axis S being the axial direction of the isolator.

Figure 2:
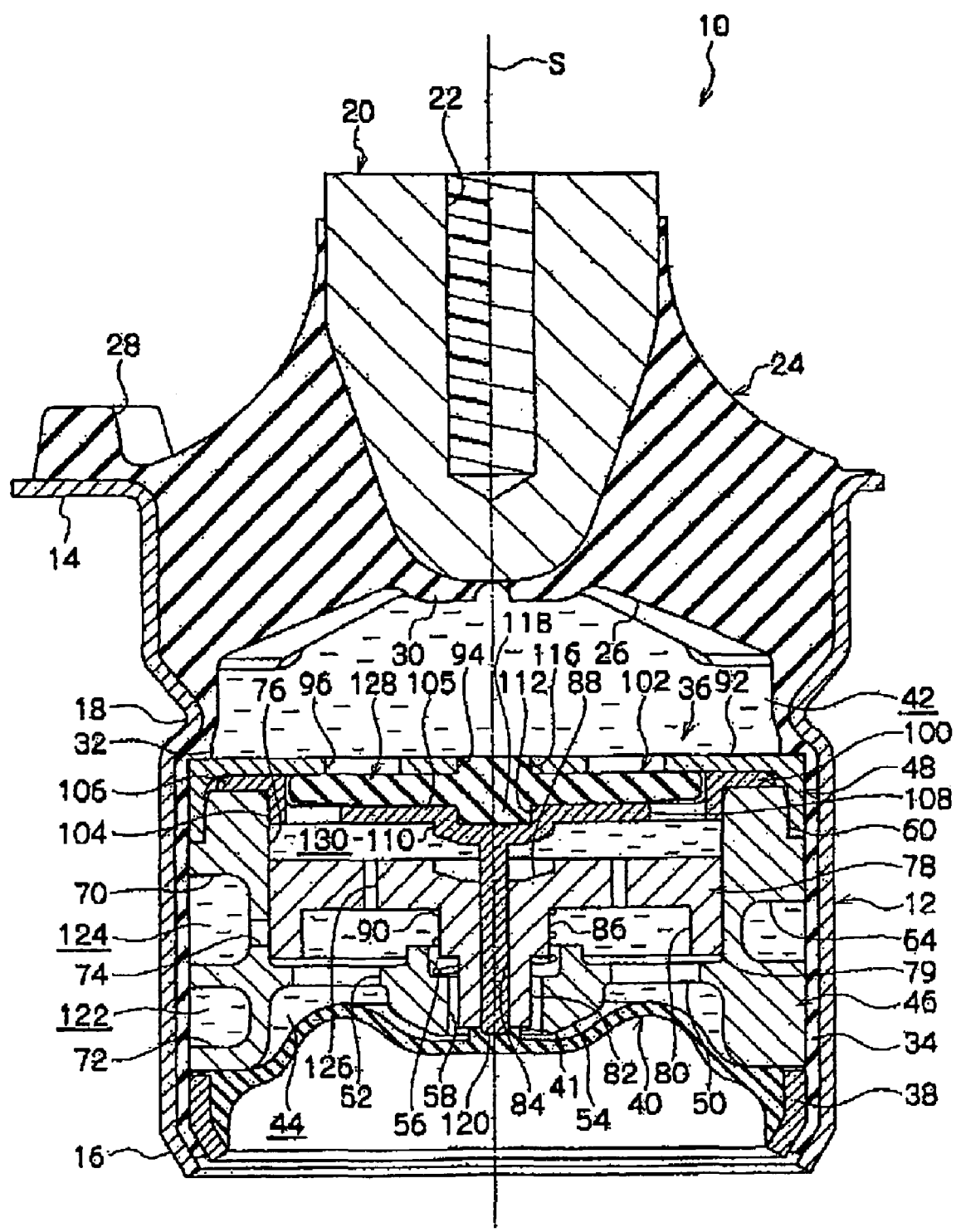
FIG. 2 is a sectional view along the axial direction showing a configuration of the vibration isolator shown in FIG. 1, showing a state in which a plunger body is at a closing position.

FIGS. 1 and 2 show a vibration isolator in accordance with an embodiment of the present invention. As shown in FIG. 1, a vibration isolator 10 is provided with an external cylinder member 12 formed into a thin-wall cylinder on the outer periphery side thereof, and an attaching member 20 is arranged on the inner periphery side of the external cylinder member 12 in a substantially coaxial manner.

The external cylinder member 12 is bendingly formed with an annular flange part 14 extending to the outer periphery side in the upper end part thereof, and is also formed with a stake part 16, which is bent to the inner periphery side in a taper form when the isolator is assembled, in the lower end part thereof. In an intermediate portion between the flange part 14 and the stake part 16, a contraction part 18 bent toward the inner periphery side in a V shape in cross section is formed throughout the entire periphery.

The vibration isolator 10 is connected to the vehicle body side of a vehicle via a cup-shaped holder member (not shown) by inserting the external cylinder member 12 into the holder member.

The upper end side of the attaching member 20 is formed into a columnar shape having a substantially fixed outside diameter, and the lower end side thereof is formed into a substantially truncated cone shape the outside diameter of which decreases downward in a taper form. In the attaching member 20, a threaded hole 22 is formed along the axis S from the upper end surface thereof toward the lower end side.

The vibration isolator 10 is connectingly fixed to the engine side of the vehicle via a fastening member such as a bolt screwed in the threaded hole 22 in the attaching member 20 and a bracket stay.

In the vibration isolator 10, a rubber elastic body 24 formed into a substantially thick-wall ring shape is arranged between the external cylinder member 12 and the attaching member 20. The outer peripheral surface of the rubber elastic body 24 is vulcanizedly bonded to the upper side of the contraction part 18 on the outer peripheral surface of the external cylinder member 12, and the inner peripheral surface thereof is vulcanizedly bonded to the lower end side of the outer peripheral surface of the attaching member 20. Thereby, the rubber elastic body 24 elastically connects the external cylinder member 12 to the attaching member 20.

The cross section of the rubber elastic body 24 is formed substantially into a chevron shape tilting downward from the attaching member 20 toward the external cylinder member 12. Thereby, in the central part of the lower surface of the rubber elastic body 24, a concave part 26 substantially having a truncated cone shape the inside diameter of which decreases from the lower side toward the upper side is formed.

The rubber elastic body 24 is integrally formed with a stopper part 28 having a rectangular cross section, which extends from the outer peripheral surface at the upper end of the rubber elastic body 24 to the outer periphery side. The stopper part 28 is vulcanizedly bonded to a part along the circumferential direction of the flange part 14 of the external cylinder member 12. When a great relative displacement takes place along the axial direction on the engine side in the state in which the vibration isolator 10 is installed on the vehicle, the stopper part 28 comes into contact with the bracket stay etc. to restrict the displacement on the engine side and also to prevent the occurrence of collision sound.

The rubber elastic body 24 is integrally formed with an inner cushion part 30, which covers the lower end part of the attaching member 20, in the inner peripheral part at the lower end thereof, and is also integrally formed with a step part 32 on the inner periphery side of the contraction part 18 of the external cylinder member 12. The lower surface side of the step part 32 is formed into a flat surface shape, and the step part 32 is supported by the contraction part 18 so that axial deformation from the outer periphery side is restricted.

Also, the rubber elastic body 24 is integrally formed with a thin-wall, cylindrical covering part 34 that extends downward from the outer peripheral part at the lower end of the step part 32. The covering part 34 is vulcanizedly bonded to the inner peripheral surface of the external cylinder member 12 so as to cover the lower end side of the external cylinder member 12.

In the vibration isolator 10, a partitioning member 36 (refer to FIG. 3) formed substantially into a thick-wall disc shape as a whole is fittedly inserted on the inner periphery side of the external cylinder member 12. The partitioning member 36 is configured so that the outer peripheral part on the upper surface thereof is brought into contact with the lower surface side of the step part 32, and the outer peripheral surface thereof is pressingly brought into contact with the inner peripheral surface of the external cylinder member 12 via the covering part 34.

Also, an annular support cylinder 38 is fittedly inserted on the lower side of the partitioning member 36 housed on the inner periphery side of the external cylinder member 12 and in the lower end part of the external cylinder member 12. The support cylinder 38 is configured so that the upper end side thereof is brought into contact with the outer peripheral part on the lower surface of the partitioning member 36, and the outer peripheral surface thereof is pressingly brought into contact with the inner peripheral surface of the external cylinder member 12 via the covering part 34.

In the vibration isolator 10, in the state in which the partitioning member 36 and the support cylinder 38 are fittedly inserted in the external cylinder member 12, the stake part 16 of the external cylinder member 12 is bent so that the inside and outside diameters are decreased from the upper end side toward the lower end side. Thereby, the partitioning member 36 and the support cylinder 38 are fixed between the step part 32 (the contraction part 18) and the stake part 16 in the external cylinder member 12.

On the inner periphery side of the support cylinder 38, a diaphragm 40 molded into a thin-wall disc shape by using a rubber material is arranged. The outer peripheral edge part of the diaphragm 40 is vulcanizedly bonded to the inner peripheral surface of the support cylinder 38 throughout the entire periphery.

Thereby, in the external cylinder member 12, there is formed a substantially column-shaped space (liquid chamber space) configured so that the upper end side thereof along the axial direction is closed by the rubber elastic body 24, and the lower end side is closed by the diaphragm 40. This fluid chamber space is partitioned into a main fluid chamber 42, in which the rubber elastic body 24 is a part of partition, and a sub-fluid chamber 44, in which the diaphragm 40 is a partition, by the partitioning member 36. The main fluid chamber 42 and the sub-fluid chamber 44 are filled with a fluid such as water or ethylene glycol.

The main fluid chamber 42 is configured so that the internal volume thereof changes (increases and decreases) along with the elastic deformation of the rubber elastic body 24, and the diaphragm 40 is configured so as to be capable of being deformed by a sufficiently low load (fluid pressure) in the direction in which the internal volume of the sub-fluid chamber 44 increases and decreases.

Figure 5:
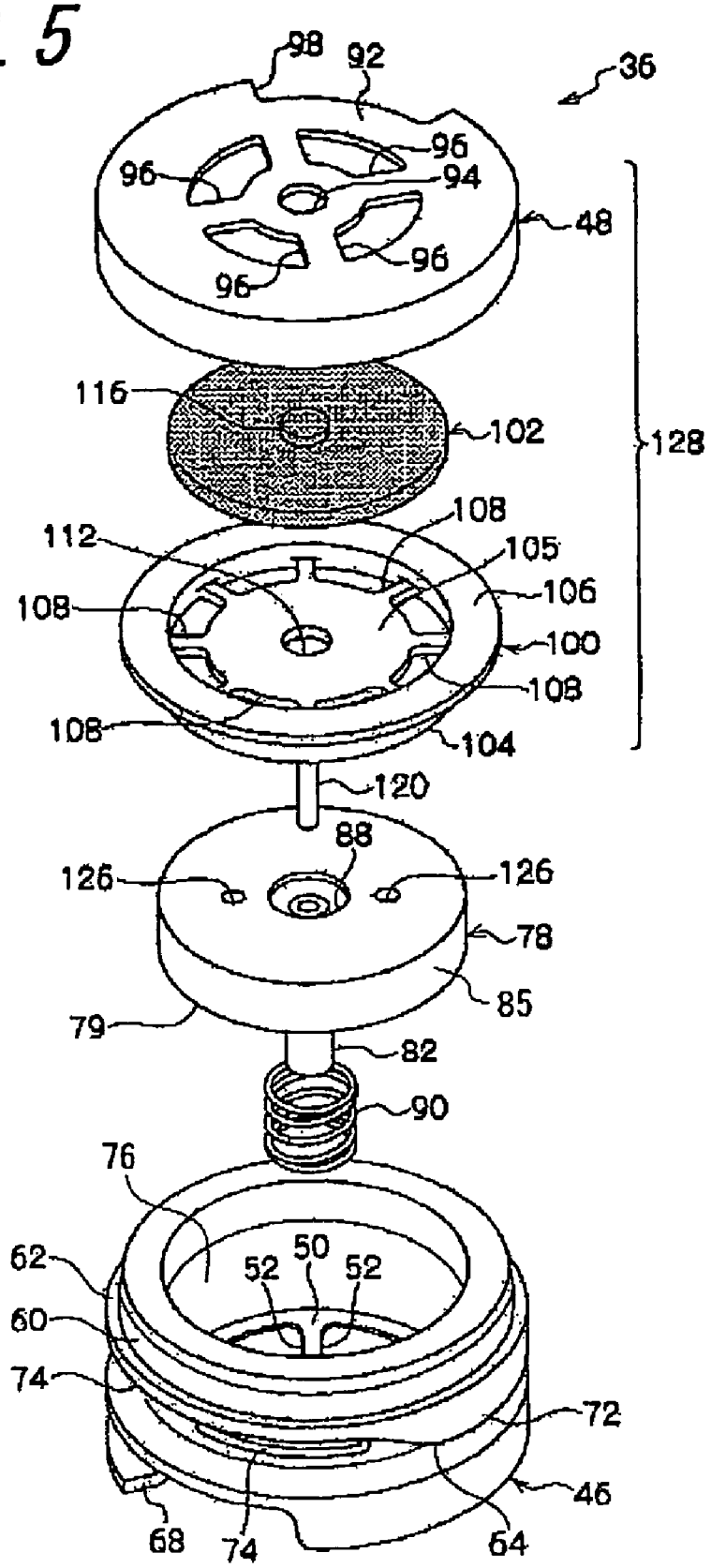
FIG. 5 is an exploded perspective view showing configurations of a partitioning member and a plunger member in the vibration isolator shown in FIG. 1.

As shown in FIG. 5, the partitioning member 36 is provided with an orifice member 46, which is formed of a synthetic resin or a metallic material such as aluminum, on the lower side thereof, and a cylindrical lid member 48 with a top plate is arranged on the upper side of the orifice member 46.

The orifice member 46 is formed into a thick-wall, bottomed cylindrical shape the lower surface side of which is closed by a bottom plate part 50. The bottom plate part 50 is formed with a plurality of (for example, four) flow openings 52. Each of the flow openings 52 is formed substantially into a fan shape in which the dimension along the circumferential direction increases from the inner periphery side toward the outer periphery side. Also, as shown in FIG. 3, a thick-wall, cylindrical boss part 54 is integrally formed on the inner periphery side of the flow openings 52.

Figure 3:
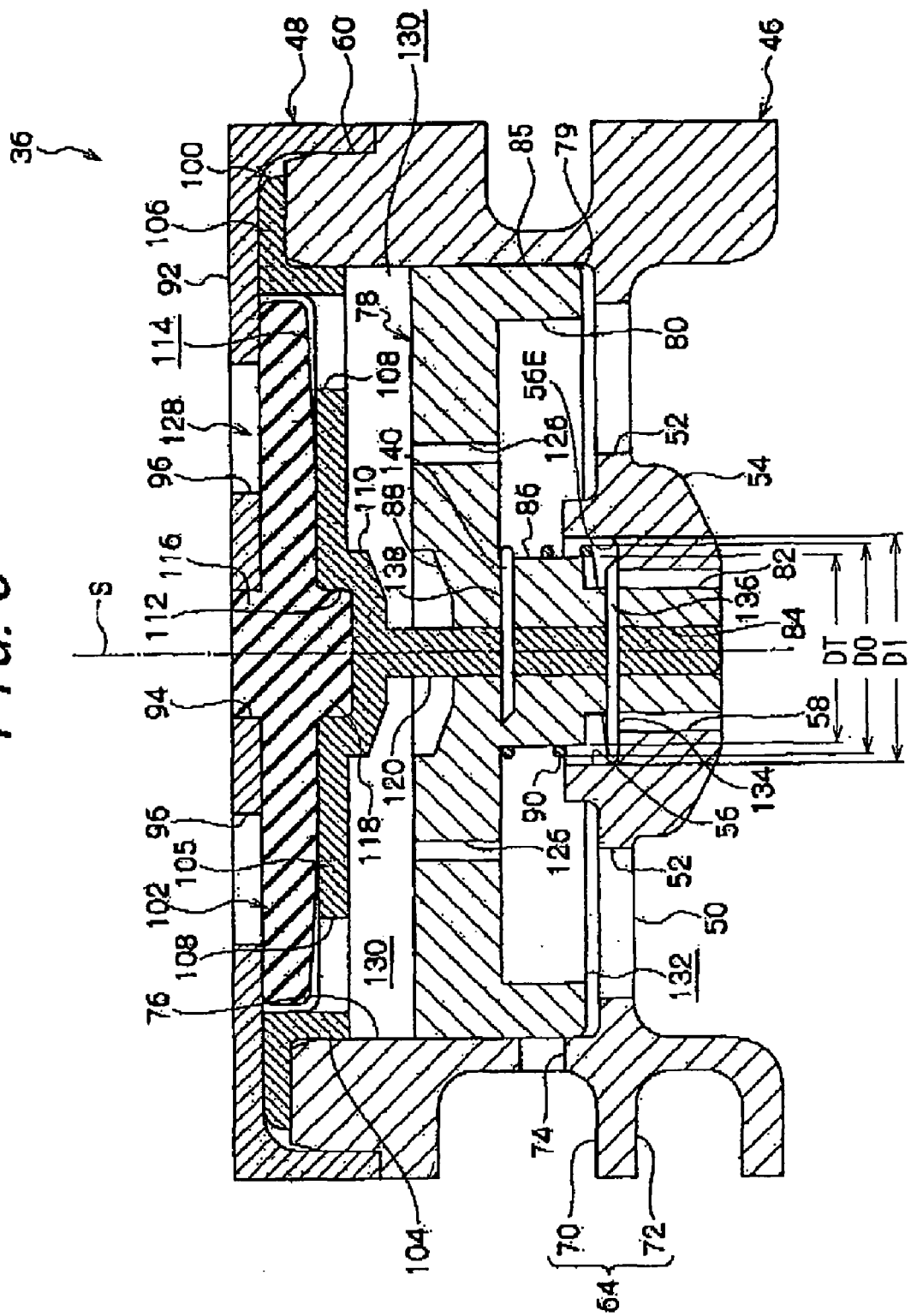
FIG. 3 is a sectional view showing configurations of a partitioning member and a plunger member in the vibration isolator shown in FIG. 1, showing a state in which a plunger member is at an opening position.

As shown in FIG. 3, the dimension along the axial direction of the boss part 54 is greater than the thickness of the bottom plate part 50, and the boss part 54 projects from the upper surface part and the lower surface part of the bottom plate part 50. In the boss part 54, a circular concave receiving seat 56 is open in the central part on the upper surface thereof, and the lower end part of a coil spring 90, described later, is inserted in the receiving seat 56.

Also, the boss part 54 is formed with a relief hole 58 penetrating between the bottom surface of the receiving seat 56 and the lower surface of the boss part 54. The inside diameter of the relief hole 58 is smaller than the inside diameter of the receiving seat 56, and in the relief hole 58, a guide cylinder part 82 of a plunger member 78, described later, is detachably inserted.

As shown in FIG. 5, the orifice member 46 is formed with an insertion part 60, which has an outside diameter smaller than that of the lower end side, in the upper end part on the outer peripheral surface thereof. Also, in the orifice member 46, a concave groove part 64, which tilts at a predetermined angle with respect to the circumferential direction and extends in a spiral form, is formed between a step part 62 on the outer peripheral surface and the lower end part. The groove part 64 is provided so as to turn around the outer peripheral surface of the orifice member 46 in turns slightly less than two turns.

As shown in FIG. 6(B), the orifice member 46 is formed with a communication path 66. The communication path 66 is formed by cutting a part of the insertion part 60 into a concave shape in the axial direction to connect one end part on the main fluid chamber 42 side along the lengthwise direction of the groove part 64 to the upper surface part of the orifice member 46.

Also, as shown in FIG. 6(C), the orifice member 46 is formed with a communication path 68. The communication path 68 is formed by cutting a part of the lower end part of the orifice member 46 into a rectangular shape in the axial direction to connect the other end part along the lengthwise direction of the groove part 64 to the lower surface of the orifice member 46.

The groove part 64 is provided with a common orifice part 70 in a section ranging from one end on the main fluid chamber 42 side to an intermediate part in the lengthwise direction (spiral direction), and a dedicated orifice part 72 is provided on the sub-fluid chamber 44 side with respect to the common orifice part 70.

Although the common orifice part 70 and the dedicated orifice part 72 have the same depth along the radial direction, the width along the axial direction of the common orifice part 70 can also be made equal to or a predetermined size greater than the width along the axial direction of the dedicated orifice part 72. Thereby, the common orifice part 70 is configured so that the cross-sectional area thereof is equal to or larger than that of the dedicated orifice part 72, so that the cross-sectional area of the common orifice part 70 corresponds to the frequency (for example, 18 to 30 Hz) and the amplitude of idle vibrations produced at the idling operation time of vehicle.

This is true for the case where the cross-sectional areas of both the orifice parts 70 and 72 are the same. The entire length of the common orifice part 70 is shorter than the total length of the common orifice part 70 and the dedicated orifice part 72, and the flow resistance of fluid becomes relatively small, so that the frequency and amplitude of idle vibrations can easily be accommodated.

As shown in FIG. 6(A), the orifice member 46 is formed with an orifice opening 74, which penetrates from the bottom surface part of the groove part 64 to the inner peripheral surface of the orifice member 46, in the vicinity of the boundary part between the common orifice part 70 and the dedicated orifice part 72 in the groove part 64. The orifice opening 74 is formed into a slot shape that is slender in the circumferential direction. The opening area of the orifice opening 74 is larger than the cross-sectional area of the common orifice part 70.

Figure 7:
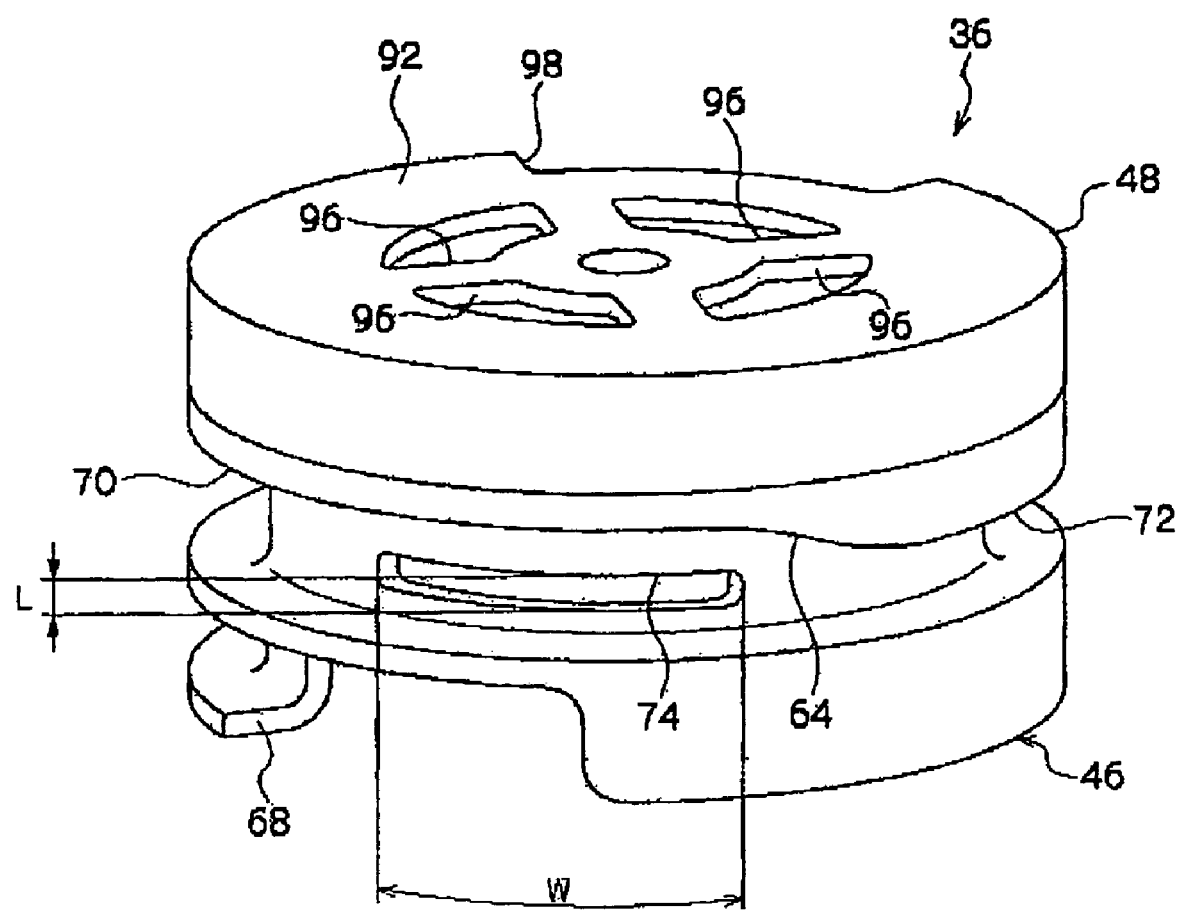
FIG. 7 is a perspective view showing a configuration of a partitioning member in the vibration isolator shown in FIG. 1.

In the vibration isolator 10 of this embodiment, when the transverse opening width, which is a dimension along the circumferential direction (lengthwise direction), of the orifice opening 74 is taken as W, and the longitudinal opening width, which is a dimension along the axial direction (direction perpendicular to the lengthwise direction), of the orifice opening 74 is taken as L as shown in FIG. 7, the opening ratio R (=W/L) between the transverse opening width W and the longitudinal opening width L is set in the range of $2 \leqq R \leqq 25$, further preferably $5 \leqq R \leqq 20$.

The orifice opening 74 is configured so that the shapes of both end parts in the circumferential direction are substantially semicircular, and the increase in fluid flow resistance near both the end parts is restricted. Also, the orifice opening 74 may be configured so that the cross-sectional shape along the fluid flow direction in the inner peripheral edge part (edge part) of the orifice opening 74 is made a convex semicircular shape or wedge shape, by which the increase in fluid flow resistance near both the end parts is restricted.

As shown in FIG. 6(C), a column-shaped space is formed on the inner periphery side of the orifice member 46, and this column-shaped space is used as a cylinder chamber 76 for housing the plunger member 78, described later. As shown in FIG. 5, the plunger member 78 is formed into a thick-wall disc shape, and divides the cylinder chamber 76 along the axial direction into a pressurization space 130 (refer to FIG. 3), which is a small space on the main fluid chamber 42 side, and an orifice space 132 (refer to FIG. 4), which is a small space on the sub-fluid chamber 44 side.

Also, the plunger member 78 is configured so that an edge part 79 on the lower end side of the outer peripheral surface thereof extends in parallel with the lengthwise direction of the orifice opening 74.

The inner peripheral surface of the cylinder chamber 76 is formed by a curved surface curving with a fixed radius of curvature with the axis S being the center.

Also, the plunger member 78 has a seal surface 85 that moves along the inner peripheral surface of the cylinder chamber 76 while a predetermined minute clearance is provided between the outer peripheral surface of the plunger member 78 and the inner peripheral surface of the cylinder chamber 76. The shape along the direction perpendicular to the axis of the seal surface 85 is circular.

As shown in FIG. 3, the plunger member 78 is formed with an annular concave part 80, which extends in the circumferential direction, between the peripheral edge part and the central part on the lower surface side thereof. Also, the plunger member 78 is integrally formed with a thick-wall, cylindrical guide cylinder part 82 projecting downward from the central part on the lower surface thereof, and is provided with a shaft accommodating hole 84 penetrating the central part of the guide cylinder part 82 in the axial direction.

The plunger member 78 is coaxially formed with a column-shaped seat receiving part 86, which has a diameter larger than that of the guide cylinder part 82, in the base end part of the guide cylinder part 82. Also, the plunger member 78 is formed with a circular concave relief part 88 in the central part on the upper surface thereof.

The plunger member 78 is inserted in the cylinder chamber 76 of the orifice member 46 so as to be movable (slidable) in the axial direction along the inner peripheral surface of the cylinder chamber 76. At this time, the tip end side of the guide cylinder part 82 of the plunger member 78 is inserted coaxially in the relief hole 58 in the orifice member 46. Since the outside diameter of the guide cylinder part 82 is smaller than the inside diameter of the relief hole 58, the plunger member 78 can move in a predetermined range (between a closing position and an opening position, described later) along the axial direction without coming into contact with the bottom plate part 50 of the orifice member 46.

Also, in the partitioning member 36, the coil spring 90 serving as an urging member is arranged between the bottom plate part 50 of the orifice member 46 and the plunger member 78.

The upper end part of the coil spring 90 is fitted on the outer periphery side of the seat receiving protrusion 86 of the plunger member 78, and the lower end thereof is inserted in the receiving seat 56 of the orifice member 46.

In this state, an upper-side bearing surface 138, which is the upper end surface of the coil spring 90, is pressingly brought into contact with the peripheral edge part of the seat receiving protrusion 86 of the plunger member 78, and a lower-side bearing surface 134, which is the lower end surface thereof, is pressingly brought into contact with the bottom surface of the receiving seat 56, by which the coil spring 90 is always kept in a compressed state by the plunger member 78 and the bottom plate part 50. Thereby, the plunger member 78 is always urged upward (to the main fluid chamber 42 side) by the coil spring 90. As the coil spring 90, a straight-shaped spring the inside and outside diameters of which are almost constant over the entire length.

Figure 4:
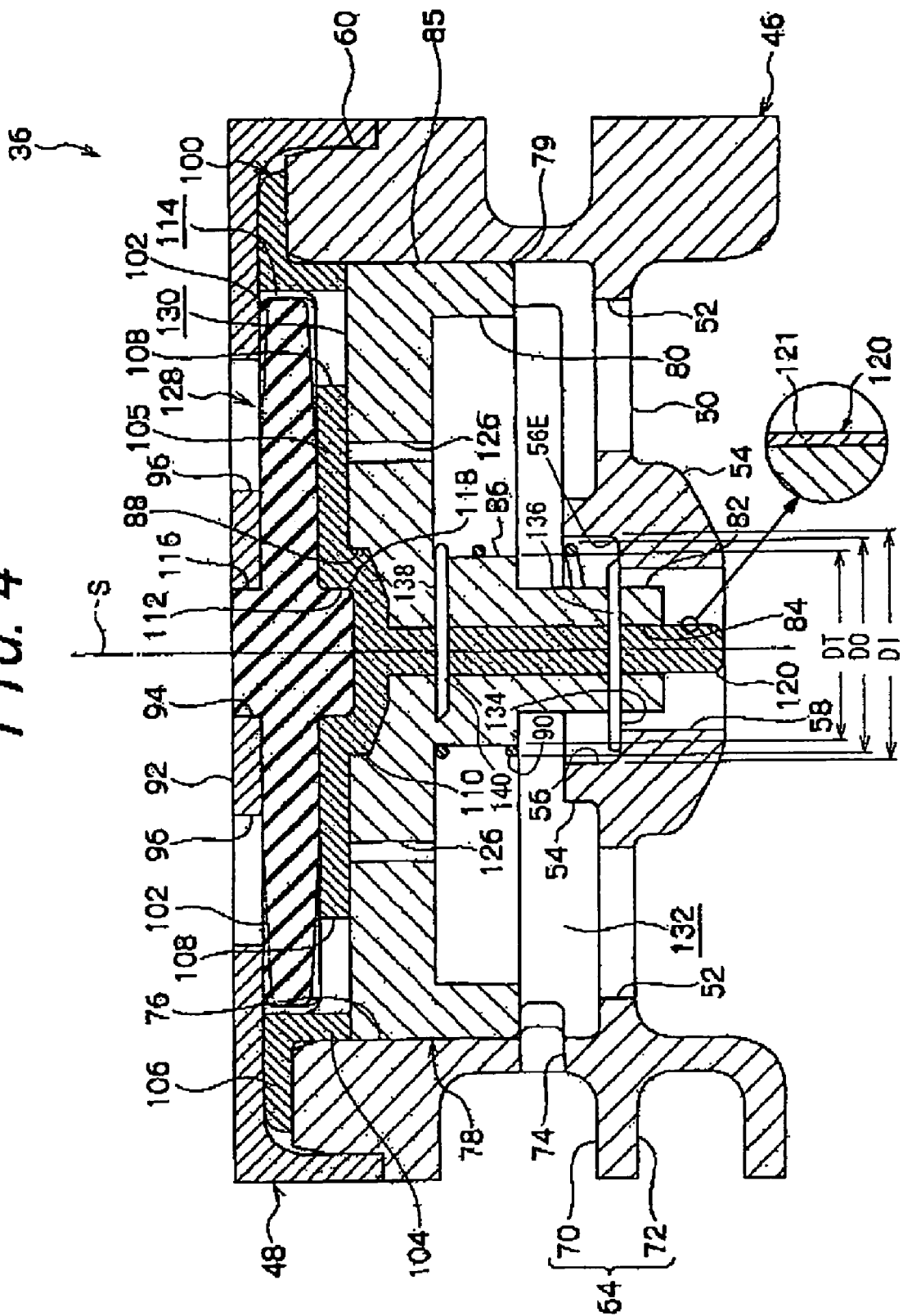
FIG. 4 is a sectional view showing configurations of a partitioning member and a plunger member in the vibration isolator shown in FIG. 1, showing a state in which a plunger member is at a closing position.

As shown in FIG. 4, the inside diameter DI of the receiving seat 56 is a predetermined length larger than the outside diameters DO of end turn parts 136 and 140 of the coil spring 90. The inner peripheral surface of the receiving seat 56 is formed as a concave curved surface with a fixed radius of curvature with the axis S being the center. An edge part 56E between the bottom surface part and the inner peripheral surface of the receiving seat 56 is rounded so as to form a concave curved surface, and in the bottom surface part of the receiving seat 56, a flat surface shaped region having a diameter corresponding to the outside diameter of the lower-side end turn part 136 is formed on the inner periphery side of the edge part 56E.

Thereby, a transverse force along the direction perpendicular to the axis is generated on the coil spring 90 having been deformed compressively or tensilely. Even if this transverse force acts on the lower-side end turn part 136, the movement in the direction perpendicular to the axis of the lower-side end turn part 136 is inhibited by the edge part 56E. Also, even if the lower-side end turn part 136 moves slightly, it is self-aligned to the original position (assembly position) by the reaction force from the edge part 56E.

Also, the inside diameter DI of the receiving seat 56 on the upper side of the edge part 56E is larger than the outside diameter DO of the coil spring 90. Therefore, the wire outer periphery side of the coil spring 90 does not come into contact with the inner peripheral surface of the receiving seat 56, so that the deformation (compressive and tensile deformation) near the lower-side end turn part 136 of the coil spring 90 is not hindered by the contact with the inner peripheral surface of the receiving seat 56, and frictional noise caused by the contact with the inner peripheral surface of the receiving seat 56 at the time of deformation of the coil spring 90 is prevented from being generated.

On the other hand, as shown in FIG. 3, the outside diameter DT of the seat receiving protrusion 86 is slightly smaller than the outside diameters DO of the end turn parts 136 and 140 of the coil spring 90. Thereby, a transverse force along the direction perpendicular to the axis is generated on the coil spring 90 having been deformed compressively or tensilely. Even if this transverse force acts on the upper-side end turn part 140, the movement in the direction perpendicular to the axis of the lower-side end turn part 136 is inhibited by the seat receiving protrusion 86.

As shown in FIG. 3, in the partitioning member 36, the lid member 48 is fittedly fixed on the outer periphery side of the insertion part 60 of the orifice member 46. Thereby, the upper end side of the cylinder chamber 76 of the orifice member 46 is closed by a top plate part 92 of the lid member 48.

As shown in FIG. 5, the lid member 48 is formed with a circular insertion hole 94 in the central part of the top plate part 92, and a plurality of (in this embodiment, four) valve seat openings 96 each having a fan shape are formed on the outer peripheral side of the insertion hole 94. These valve seat openings 96 are arranged so as to have the positional relationship that is symmetric with the axis S being the center (point symmetry).

Also, as shown in FIG. 5, the lid member 48 is formed with a notch part 98, so as to face to the communication path 66 (refer to FIG. 6(B)) on the upper end side of the orifice member 46, in the outer peripheral part thereof. The common orifice part 70 communicates with the main fluid chamber 42 via the notch part 98 of the lid member 48 and the communication path 66.

As shown in FIG. 5, in the partitioning member 36, a substantially disc-shaped holder member 100 is arranged between the lid member 48 and the plunger member 78, and a substantially disc-shaped valve element 102 is interposed between the holder member 100 and the lid member 48.

As shown in FIG. 3, the holder member 100 is formed with a valve element holder 104, which has a shallow, bottomed cylindrical shape, on the center side thereof, and also is bendingly formed with an annular flange part 106 extending from the upper end part of the valve element holder 104 to the outer periphery side. Also, the holder member 100 is provided with a plurality of communication openings 108, each of which has a fan shape, in the outer peripheral part of a bottom plate part 105 of the valve element holder 104.

As shown in FIG. 3, the holder member 100 is integrally formed with a thick-wall disc-shaped boss part 110 in the central part of the bottom plate part 105, and also is integrally formed with a round rod-shaped guide rod 120 projecting downward along the axis S from the central part on the lower surface of the boss part 110.

Also, on the upper surface side of the boss part 110, a circular concave insertion depression 112 is formed. Between the top plate part 92 of the lid member 48 and the bottom plate part 105 of the holder member 100, a valve element accommodating chamber 114, which is a disc-shaped space having a fixed thickness along the axial direction, is formed on the outer periphery side of the insertion depression 112, and a valve element 102 is accommodated in the valve element accommodating chamber 114.

The valve element 102 is molded by using a rubber composition such as NR and NBR. The upper surface side of the valve element 102 is formed into a flat surface shape, and the lower surface side thereof is formed into a slope shape slightly tilting upward from the inner periphery side toward the outer periphery side so that the thickness along the axial direction decreases gradually from the inner periphery side toward the outer periphery side.

Also, the valve element 102 is formed with a circular convex protrusion part 116 in the central part on the upper surface thereof, and also is formed with a circular convex protrusion part 118 in the central part on the lower surface thereof. The protrusion part 116 on the upper surface side of the valve element 102 is inserted in the insertion hole 94 in the lid member 48, and the protrusion part 118 on the lower surface side thereof is inserted in the insertion depression 112 of the holder member 100.

Thereby, the valve element 102 is positioned coaxially with the holder member 100 and the lid member 48, and the movement in the radial direction thereof is restricted.

Portions near the peripheral edge parts of the protrusion parts 116 and 118 of the valve element 102 are compressed in the axial direction between the top plate part 92 of the lid member 48 and the bottom plate part 105 of the holder member 100.

Thereby, the upper surface part of the valve element 102 is pressingly brought into contact with the lower surface side of the top plate part 92 of the lid member 48 by a predetermined pressure (preload), and the movement of the valve element 102 in the axial direction between the lid member 48 and the holder member 100 is restricted. A thin-wall part on the outer periphery side of the compressed portion of the valve element 102 can deflect downward.

As shown in FIG. 3, The outer peripheral end of the valve element 102 is positioned on the outer periphery side of the outer peripheral end of the valve seat openings 96 in the lid member 48, and is positioned on the inner periphery side of the outer peripheral end of the communication openings 108 in the holder member 100.

Thereby, the valve element 102 closes the valve seat openings 96 in the state in which the upper surface part thereof is pressingly brought into contact with the top plate part 92 (closed state). Also, when the outer periphery side of the valve element 102 deflects downward and is separated from the top plate part 92 (opened state) as indicated by the two-dot chain line in FIG. 4, the valve seat openings 96 communicate with the communication openings 108 via the valve element accommodating chamber 114, and the main fluid chamber 42 communicates with the cylinder chamber 76 in the partitioning member 36 through the valve element accommodating chamber 114.

That is to say, the valve element 102, the lid member 48, and the holder member 100, which are accommodated in the valve element accommodating chamber 114, form a check valve 128 between the main fluid chamber 42 and the cylinder chamber 76. This check valve 128 allows only the flow of liquid from the main fluid chamber 42 into the cylinder chamber 76 (pressurization space 130), and inhibits the flow of fluid from the pressurization space 130 into the main fluid chamber 42.

The guide rod 120 of the holder member 100 is inserted in the shaft accommodating hole 84 in the plunger member 78 so as to be slidable relatively in the axial direction. In the case where one of the guide cylinder part 82 in which the shaft accommodating hole 84 is formed and the guide rod 120 is formed of a metal, the other of these elements is preferably formed of a material that has a Young's modulus a predetermined value or more different from that of the metal and small frictional resistance, such as a resin. Also, at least one of the inner peripheral surface of the shaft accommodating hole 84 and the outer peripheral surface of the guide rod 120 may be coated with a substance having lubricity and superior wear resistance to restrain the frictional resistance.

The tip end side of the guide rod 120 reaches the lower end of the orifice member 46 through the receiving seat 56 and the relief hole 58 of the orifice member 46. To the tip end part of the guide rod 120, a center connection part 41 formed into a circular convex shape in the central part of the diaphragm 40 is fixed by vulcanized bonding.

As shown in the enlarged view in FIG. 4, the surface of the guide rod 120 is coated with a ceramic material, by which a ceramic layer 121 is formed on the surface of the guide rod 120. As the ceramic material that is the raw material for the ceramic layer 121, a silicon nitride based ceramic whose principal component is $Si_3N_4$ is used. The reason for this is that the silicon nitride based ceramic has high corrosion resistance and wear resistance. In addition, the silicon nitride based ceramic provides a high frictional resistance decreasing function in ethylene glycol having a hydroxyl group as compared with other ceramic materials.

The reason why the silicon nitride based ceramic provides a high frictional resistance decreasing function in ethylene glycol has not been made clear exactly at present. For example, according to the in-house publication data issued on Nov. 2, 1996, by National Institute of Advanced Industrial Science and Technology, independent administrative agency (can be browsed through the website of the Institute (Technoknowledge Network)), there is pointed out a possibility that under alcohol lubrication, alkoxysilane may be yielded on the surface of silicon nitride based ceramic by the reaction with alcohol, by which an alkoxysilane layer serving as a friction restraining substance may be formed on the surface of silicon nitride based ceramic, and a possibility that a reaction similar to this may take place even in ethylene glycol is presumed.

As a method for coating the surface of the guide rod 120 with a silicon nitride based ceramic, publicly known various methods can be used. The ceramic layer 121 can be formed by using, for example, the vacuum deposition method, ion plating method, sputtering method, CVD method (chemical vapor deposition method), laser deposition method, or plasma spraying method.

As shown in FIG. 1, the orifice space 132 in the cylinder chamber 76 always communicates with the sub-fluid chamber 44 through the plurality of flow openings 52, the receiving seat 56, and the relief hole 58 of the orifice member 46.

Also, in the vibration isolator 10, the outer periphery side of the groove part 64 in the orifice member 46 is closed by the inner peripheral surface of the external cylinder member 12 via the covering part 34. Thereby, a shake orifice 122, which is a spiral, slender space, is formed in the groove part 64. One end part of the shake orifice 122 is connected to the main fluid chamber 42 via the communication path 66 of the orifice member 46 and the notch part 98 of the lid member 48, and the other end part thereof is connected to the sub-fluid chamber 44 via the communication path 68 of the orifice member 46.

The shake orifice 122 is formed by the whole of the groove part 64 consisting of the common orifice part 70 and the dedicated orifice part 72, which have cross-sectional areas different from each other, and the communication paths 66 and 68. The path length and cross-sectional area of the shake orifice 122, that is, the flow resistance of fluid in the shake orifice 122 is set (tuned) so as to isolate shake vibrations (for example, 9 to 15 Hz), which are vibrations in a relatively low frequency zone of the input vibrations.

The common orifice part 70 in the groove part 64 forms a part of an idle orifice 124 for isolating idle vibrations (for example, 18 to 30 Hz), which are vibrations in a relatively high frequency zone as compared with shake vibrations. The idle orifice 124 is formed by the common orifice part 70, the orifice opening 74, and the orifice space 132 in the orifice member 46. The path length and cross-sectional area of the idle orifice 124, that is, the flow resistance of fluid in the idle orifice 124 is set (tuned) so as to isolate idle vibrations.

The flow resistance of fluid in the idle orifice 124 is smaller than that in the shake orifice 122.

In the vibration isolator 10, as shown in FIG. 2, when the plunger member 78 moves (lowers) to the closing position, the orifice opening 74 in the orifice member 46 is closed by the outer peripheral surface of the plunger member 78, and a state in which the common orifice part 70 does not communicate with the orifice space 132 is formed. Thereby, the main fluid chamber 42 is caused to communicate with the sub-fluid chamber 44 through the shake orifice 122 only.

Also, in the vibration isolator 10, as shown in FIG. 1, when the plunger member 78 moves (rises) to the opening position, the plunger member 78 separates from the orifice opening 74 to open the orifice opening 74, so that the common orifice part 70 becomes in a state of communicating with the orifice space 132. Thereby, the main fluid chamber 42 and the sub-fluid chamber 44 communicate with each other through both of the shake orifice 122 and the idle orifice 124. When the fluid pressure in the main fluid chamber 42 changes, the fluid having flown from the main fluid chamber 42 into the common orifice part 70 reaches a portion near the boundary part with the dedicated orifice part 72 and flows preferentially into the orifice space 132 through the orifice opening 74 having fluid flow resistance smaller than that of the dedicated orifice part 72. Also, the fluid having flown into the common orifice part 70 through the orifice opening 74 flows into the main fluid chamber 42 after preferentially passing through the common orifice part 70 having fluid flow resistance smaller than that of the dedicated orifice part 72.

Thereby, in the vibration isolator 10, when the plunger member 78 is at the opening position, the fluid flows between the main fluid chamber 42 and the sub-fluid chamber 44 substantially passing through the idle orifice 124 only.

As shown in FIG. 3, the plunger member 78 is formed with a plurality of (in this embodiment, two) fluid pressure releasing paths 126, which penetrate in the axial direction, in the intermediate part in the radial direction thereof. When the plunger member 78 at the closing position is moved to the opening position side by the urging force of the coil spring 90, these fluid pressure releasing paths 126 allow the fluid in the pressurization space 130 isolated from the outside to flow out into the orifice space 132, so that the rise in fluid pressure in the pressurization space 130 is prevented, and the plunger member 78 can move to the opening position side.

In the vibration isolator in accordance with this embodiment, when the maximum tilt angle of the plunger member 78 with respect to the axial direction, which is calculated according to a difference between the inside diameter of the shaft accommodating hole 84 and the outside diameter of the guide rod 120, is taken as $\theta_{MAX}$, a difference $D_{MIN}$ between the inside diameter of the cylinder chamber 76 and the outside diameter of the seal surface 85 of the plunger member 78 is set so that any portion on the seal surface 85 of the plunger member 78 keeps a clearance of 0 mm or larger between the seal surface 85 and the inner peripheral surface of the cylinder chamber 76 in the state in which the plunger member 78 tilts at the maximum tilt angle $\theta_{MAX}$.

Next, a method for calculating the aforementioned $D_{MIN}$ is specifically explained with reference to FIG. 8. FIG. 8 schematically shows the plunger member 78 and the guide rod 120 in the vibration isolator 10 in accordance with this embodiment.

In FIG. 8(A), $L_1$ denotes the dimension along the axial direction of the shaft accommodating hole 84, $R_1$ denotes the radius of the guide rod 120, $R_2$ denotes the radius of the plunger member 78, $C_L$ denotes $D_{MIN}/2$, that is, the width of clearance between the outer peripheral surface of the guide rod 120 and the inner peripheral surface of the shaft accommodating hole 84, and $C_P$ denotes the center point in the axial direction and the radial direction of the shaft accommodating hole 84. In the explanation below, it is assumed that the center point $C_P$ is the turning center of the plunger member 78.

Symbols $H_U$ and $H_L$ denote distances along the axial direction from $C_P$ to the upper end and the lower end of the seal surface 85, respectively. In the computational expressions below, $H_U$ or $H_L$, whichever is larger, (in this embodiment, $H_U$) is used as a parameter H.

First, a case is assumed in which the plunger member 78 is tilted around $C_P$ until the upper end and lower end of the shaft accommodating hole 84 touch the axis S. A length $L_3$ between $C_P$ and a point at which the upper end of the shaft accommodating hole 84 touches the axis S is calculated by Formula (1), and a tilt angle $\theta_1$ of the plunger member 78 at this time is calculated by Formula (2).

[Formula 1]
$$L_3 = \sqrt{\left(\frac{L_1}{2}\right) + (R_1 + C_L)^2} \quad (1)$$

[Formula 2]
$$\theta_1 = \tan^{-1}\left(\frac{\frac{L_1}{2}}{R_1 + C_L}\right) \quad (2)$$

Next, considering the radius $R_1$ of the guide rod 120, the maximum angle $\theta_{MAX}$ at which the plunger member 78 can tilt with respect to the axis S in the range of the clearance $C_L$ is calculated by Formula (3) and Formula (4). Also, a length $L_2$ between $C_P$ and the upper end of the seal surface 85 is calculated by Formula (5).

[Formula 3]
$$\theta_{max} + \theta_1 = \cos^{-1}\left(\frac{R_1}{L_3}\right) \quad (3)$$

[Formula 4]
$$\therefore \theta_{max} = \cos^{-1}\left(\frac{R_1}{L_3}\right) - \tan^{-1}\left(\frac{\frac{L_1}{2}}{R_1 + C_L}\right) \quad (4)$$

[Formula 5]
$$L_2 = \sqrt{R_2^2 + H^2} \quad (5)$$

$L_3$ and $\theta_{MAX}$ are substituted into Formula (6) to determine the length $L_4$ of the oblique side of a portion projecting from the seal surface 85 before tilting to the outer periphery (inner peripheral surface of the cylinder chamber 76) side when the plunger member 78 tilts at $\theta_{MAX}$. Also, the angle $\theta_3$ formed between the line segment ($L_2$) connecting $C_P$ to the upper end of the seal surface 85 and the seal surface 85 is obtained by Formula (7).

[Formula 6]
$$L_4 = 2L_2\sin\left(\frac{\theta_{max}}{2}\right) \quad (6)$$

[Formula 7]
$$\theta_3 = \cos^{-1}\left(\frac{H}{L_2}\right) \quad (7)$$

Finally, the angle $\theta_4$ formed between the oblique side ($L_4$) of the portion projecting from the seal surface 85 before tilting to the outer periphery (inner peripheral surface of the cylinder chamber 76) side when the plunger member 78 tilts at the angle $\theta_{MAX}$ and the seal surface 85 is obtained by Formula (8) and Formula (9). Substituting this angle $\theta_4$ into Formula (10) below, the length $L_5$ of the base of the portion projecting from the seal surface 85 before tilting to the outer periphery (inner peripheral surface of the cylinder chamber 76) side when the plunger member 78 tilts at the angle $\theta_{MAX}$, that is, the maximum projection amount of the seal surface 85 is calculated.

[Formula 8]
$$\theta_4 + \theta_3 = \frac{180° - \theta_{max}}{2} \quad (8)$$

[Formula 9]
$$\therefore \theta_4 = \frac{180° - \theta_{max}}{2} - \cos^{-1}\left(\frac{H}{L_2}\right) \quad (9)$$

[Formula 10]
$$L_5 = L_4 \sin\theta_4 \quad (10)$$

In the vibration isolator 10 in accordance with this embodiment, even if the plunger member 78 tilts at the maximum tilt angle $\theta_{MAX}$ with respect to the axis S, if the clearance $C_L$ is set at the length $L_5$ or larger, that is, if the difference $D_{MIN}$ between the inside diameter of the cylinder chamber 76 and the outside diameter of the seal surface 85 is set at ($2 \times L_5$) or larger, any portion on the seal surface 85 keeps a clearance of 0 mm or larger between the seal surface 85 and the inner peripheral surface of the cylinder chamber 76, so that the seal surface 85 does not come into contact with the inner peripheral surface of the cylinder chamber 76 in a pressurized state.

Next, as a computation example, the numerical values are set as parameters (apparatus constants) for calculating $D_{MIN}$ as described below, and $D_{MIN}$ is specifically calculated by using these apparatus constants.

When the apparatus constants are set so that $L_1$=15 (mm), $R_1$=1.5 (mm), $R_2$=20 (mm), $C_L$=0.05 (mm), and H=10 (mm), $L_3$=7.658 (rad), the maximum tilt angle $\theta_{MAX}$=0.007 (rad), $L_2$=22.361 (mm), $L_4$=0.149 (mm), $\theta_4$=0.460 (rad), and $L_5$=0.667 (mm) are calculated by Formulas (1) to (10).

Therefore, if the difference $D_{MIN}$ between the inside diameter of the cylinder chamber 76 and the outside diameter of the seal surface 85 is set at ($2 \times L_5$)=1.334 (mm) or larger, any portion on the seal surface 85 keeps a clearance of 0 mm or larger between the seal surface 85 and the inner peripheral surface of the cylinder chamber 76, so that the seal surface 85 does not come into contact with the inner peripheral surface of the cylinder chamber 76 in a pressurized state.

However, since the guide rod 120 and the shaft accommodating hole 84 each inevitably have a dimensional error with respect to the design value, which error is produced at the time of manufacture, the difference $D_{MIN}$ calculated as described above must further be corrected based on the dimensional error of the outside diameter of the guide rod 120, the roundness of the guide rod 120, the distortion amount of the guide rod 120 with respect to the axis S, the dimensional error of the inside diameter of the shaft accommodating hole 84, the roundness of the shaft accommodating hole 84, and the distortion amount of the shaft accommodating hole 84 with respect to the axis S. Therefore, a value obtained by multiplying the difference $D_{MIN}$ calculated as described above by a correction factor of 105 to 120% according to the aforementioned dimensional errors is adopted as the actual design value.

Next, the operation of the vibration isolator 10 in accordance with the embodiment of the present invention is explained.

In the vibration isolator 10, for example, when the vehicular engine is operated, vibrations produced in the engine are transmitted to the rubber elastic body 24 via the attaching member 20, by which the rubber elastic body 24 is elastically deformed. At this time, the rubber elastic body 24 acts as a vibration-absorbing main part, and vibrations are absorbed by the vibration-absorbing action based on the internal friction etc. of the rubber elastic body 24, so that vibrations transmitted to the vehicle body side via the external cylinder member 12 are reduced.

On the vehicle such as an automobile, at the time of idling operation, the engine produces idle vibrations, which are vibrations in a relatively high frequency zone, and at the time of running at a predetermined speed or higher, the engine produces shake vibrations, which are vibrations in a relatively low frequency zone.

Also, in the vibration isolator 10, a part on the main fluid chamber 42 side of the shake orifice 122 is used as the common orifice part 70 forming a part of the idle orifice 124, and between the common orifice part 70 and the dedicated orifice part 72, which is a part on the sub-fluid chamber 44 side of the shake orifice 122, the orifice opening 74 communicating with the orifice space 132 of the cylinder chamber 76 is formed. Therefore, the main fluid chamber 42 and the sub-fluid chamber 44 are caused to communicate with each other by the common orifice part 70 and the shake orifice 122 including the dedicated orifice part 72, and are caused to communicate with each other also by the common orifice part 70 and the idle orifice 124 including the orifice space 132.

Further, in the vibration isolator 10, when the plunger member 78 is moved from the opening position to the closing position against the urging force of the coil spring 90 by the fluid pressure in the pressurization space 130 of the cylinder chamber 76, the orifice opening 74 is closed, and when the plunger member 78 is returned from the closing position to the opening position by the urging force of the coil spring 90, the orifice opening 74 is opened. Therefore, when the plunger member 78 at the opening position is moved to the closing position by the fluid pressure supplied from the main fluid chamber 42 into the pressurization space 130 through the check valve 128, the fluid flows back and forth between the main fluid chamber 42 and the sub-fluid chamber 44 passing through the shake orifice 122 only along with the elastic deformation of the rubber elastic body 24. When the plunger member 78 at the closing position is returned to the opening position by the urging force of the coil spring 90, both of the shake orifice 122 and the idle orifice 124 become in an opened state, and the fluid flows back and forth between the main fluid chamber 42 and the sub-fluid chamber 44 preferentially passing through the idle orifice 124 having relatively small fluid flow resistance along with the elastic deformation of the rubber elastic body 24.

That is to say, in the vibration isolator 10, when shake vibrations having a relatively low frequency and large amplitude are input, the rubber elastic body 24 is elastically deformed by the shake vibrations. Therefore, a relatively large fluid pressure change occurs in the main fluid chamber 42, and the fluid flows from the main fluid chamber 42 into the pressurization space 130 through the check valve 128 at the time when the fluid pressure in the main fluid chamber 42 rises periodically, so that the fluid pressure in the pressurization space 130 also rises to an equilibrium pressure substantially in equilibrium with the fluid pressure at the rising time in the main fluid chamber 42.

In the vibration isolator 10, the urging force of the coil spring 90 is set so as to be smaller than the value corresponding to the fluid pressure (equilibrium pressure) in the pressurization space 130 at the time of input of shake vibrations. Therefore, at the time of input of shake vibrations, the plunger member 78 moves intermittently from the opening position to the closing position against the urging force of the coil spring, and is held at the closing position by the fluid pressure in the pressurization space 130.

Therefore, in the vibration isolator 10, at the time of input of shake vibrations, the fluid flows back and forth between the main fluid chamber 42 and the sub-fluid chamber 44 through the shake orifice 122 only along with the elastic deformation of the rubber elastic body 24. Therefore, the input vibrations (shake vibrations) can be absorbed by the viscous resistance and pressure loss of the fluid passing through the shake orifice 122, so that vibrations in the low frequency zone transmitted from the engine side to the vehicle body side of the vehicle can be reduced.

At this time, since the flow resistance of fluid in the shake orifice 122 is set (tuned) so as to correspond to the frequency and amplitude of shake vibrations, a resonance phenomenon (liquid column resonance) takes place on the fluid that flows back and forth between the main fluid chamber 42 and the sub-fluid chamber 44 through the shake orifice 122, so that the shake vibrations can be absorbed especially effectively by the action of the liquid column resonance.

Also, in the vibration isolator 10, when idle vibrations having a relatively high frequency and small amplitude are input, the rubber elastic body 24 is elastically deformed by the idle vibrations, and a relatively small fluid pressure change occurs in the main fluid chamber 42. Therefore, the fluid flows from the main fluid chamber 42 into the pressurization space through the check valve 128 at the time when the fluid pressure in the main fluid chamber 42 rises periodically, so that the fluid pressure in the pressurization space 130 rises, and reaches the equilibrium pressure substantially in equilibrium with the fluid pressure (the maximum value) at the rising time in the main fluid chamber 42.

However, in the vibration isolator 10, the urging force of the coil spring 90 is set so as to be larger than the value corresponding to the equilibrium pressure in the pressurization space 130 at the time of input of idle vibrations. Therefore, when the plunger member 78 is at the opening position, it is held at the opening position by the urging force of the coil spring 90. When the plunger member 78 is at the closing position, it is moved (returned) from the closing position to the opening position by the urging force of the coil spring 90.

When the plunger member 78 at the closing position is moved to the opening position side by the urging force of the coil spring 90, the fluid pressure releasing path 126 formed in the plunger member 78 allows the fluid in the pressurization space 130 isolated from the outside to flow out into the orifice space 132, so that the rise in fluid pressure in the pressurization space 130 is prevented, and the plunger member 78 can move to the opening position side smoothly with low movement resistance.

Therefore, in the vibration isolator 10, at the time of input of idle vibrations, the fluid flows back and forth between the main fluid chamber 42 and the sub-fluid chamber 44 preferentially passing through the idle orifice 124 having small fluid flow resistance as compared with the shake orifice 122 along with the elastic deformation of the rubber elastic body 24. Therefore, the input vibrations (idle vibrations) can be absorbed by the viscous resistance, pressure loss, and the like of the fluid flowing through the idle orifice 124, so that idle vibrations transmitted from the engine side to the vehicle body side can be reduced.

At this time, since the flow resistance of fluid in the idle orifice 124 is set (tuned) so as to correspond to the frequency and amplitude of idle vibrations, a resonance phenomenon (liquid column resonance) takes place on the fluid that flows back and forth between the main fluid chamber 42 and the sub-fluid chamber 44 through the idle orifice 124, so that the idle vibrations can be absorbed especially effectively by the action of the liquid column resonance.

As the result, according to the vibration isolator 10, the orifice that causes the main fluid chamber 42 and the sub-fluid chamber 44 to communicate with each other can be changed over to either one of the shake orifice 122 and the idle orifice 124 according to the frequency of input vibrations by using the fluid pressure change in the main fluid chamber 42 as a driving force without the use of a valve mechanism that is operated by receiving control from the outside using an electromagnetic solenoid, a pneumatic solenoid, or the like and power supply. Also, since a part on the main fluid chamber 42 side of the shake orifice 122 is used as the common orifice part 70 forming a part of the idle orifice 124, a part of the idle orifice 124 can be formed by the common orifice part 70 in the shake orifice 122. Therefore, the two orifices of the shake orifice 122 and the idle orifice 124 can be arranged efficiently in a limited space in the external cylinder member 12, so that the size of isolator can be made small efficiently.

Also, in the vibration isolator 10, the opening ratio R (=W/L) between the transverse opening width W and the longitudinal opening width L of the orifice opening 74 is set in the range of $2 \leq R \leq 20$, further preferably $5 \leq R \leq 20$, so that the longitudinal opening width L can be made sufficiently small while an opening area necessary for the orifice opening 74 is secured. Therefore, the distance between the opening position and the closing position of the plunger member 78 can be shortened according to the longitudinal opening width L.

As the result, according to the vibration isolator 10, the axial dimension of the partitioning member 36 in which the cylinder chamber 76 is arranged can be decreased as compared with the case where the longitudinal opening width L of the orifice opening 74 is equal to the transverse opening width W or the longitudinal opening width L is greater than the transverse opening width W, so that the axial dimension of the whole of isolator can be decreased efficiently, and the displacement of the plunger member 78 required when the plunger member 78 opens and closes the orifice opening 74 can also be decreased. Therefore, when the input vibrations change from the shake vibrations to the idle vibrations and vice versa, the speed of response required for changing the idle orifice 124 from one to the other of the opened state and the closed state can be reduced.

The reason why the opening ratio R (=W/L) of the orifice opening 74 is set at 2 or higher is that if the opening ratio R is set at a value lower than 2, the decrease amount of the dimension along the axial direction of the partitioning member 36 (the orifice member 46) is small, so that it is difficult to effectively decrease the size of isolator. In particular, if the opening ratio R is set at 5 or higher, the dimension along the axial direction of the partitioning member 36 (the orifice member 46) can be decreased significantly, so that a great effect can be achieved in decreasing the size of isolator.

The reason why the opening ratio R (=W/L) of the orifice opening 74 is set at 25 or lower is that according to an experiment conducted by the inventors, if the opening ratio R exceeds 25, there is a high possibility that the influence of fluid viscosity rises suddenly and reaches a critical point at which the fluid flow resistance in the orifice opening 74 increases suddenly.

If the opening ratio R of the orifice opening 74 reaches the critical point, even in the case where the opening area of the orifice opening 74 is increased, the flow resistance in the orifice opening 74 scarcely decreases, so that a phenomenon that inhibits the fluid flow between the main fluid chamber 42 and the sub-fluid chamber 44 passing through the idle orifice 124 may take place. However, in the case where a substance having a high viscosity (for example, ethylene glycol) is used as the fluid, the influence of viscous resistance increases as compared with the case where a substance having a low viscosity (for example, water) is used, so that the opening ratio R (=W/L) is preferably set at 20 or lower.

In the vibration isolator 10, since a part on the main fluid chamber 42 side of the shake orifice 122 is used as the common orifice part 70 forming a part of the idle orifice 124, a part of the idle orifice 124 can be formed by the common orifice part 70 of the shake orifice 122. Therefore, the two orifices of the shake orifice 122 and the idle orifice 124 can be arranged efficiently in a limited space in the external cylinder member 12, so that the size of isolator can also be made small efficiently.

In this embodiment, since the shake orifice 122 (the common orifice part 70 and the dedicated orifice part 72) and a part of the idle orifice 124 (the common orifice part 70) are formed on the outer peripheral surface of the orifice member 46 formed into a substantially cylindrical shape, and also the cylinder chamber 76 (the orifice space 132) is provided on the inner periphery side of the orifice member 46, while suppressing the increase of axial and radial sizes of the orifice member 46 (the partitioning member 36), the shake orifice 122 requiring a relatively long path length and the idle orifice 124 requiring a large cross-sectional area can be arranged efficiently in the partitioning member 36. As a result, the size of the whole of isolator can also be decreased efficiently.

Also, in the vibration isolator 10, since the shaft accommodating hole 84 is provided in the plunger member 78, and the guide rod 120 provided on the holder member 100 is inserted in the shaft accommodating hole 84 so as to be slidable relatively, the occurrence of eccentricity and tilt of the plunger member 78, which moves in the axial direction, with respect to the axis S can be restricted. Therefore, when the frequency of input vibrations changes, the plunger member 78 can move smoothly to the opening/closing position side or the closing position side.

Further, in the vibration isolator 10, when the maximum tilt angle of the plunger member 78 with respect to the axial direction, which is calculated according to a difference between the inside diameter of the shaft accommodating hole 84 and the outside diameter of the guide rod 120, is taken as $\theta_{MAX}$, the difference $D_{MIN}$ between the inside diameter of the cylinder chamber 76 and the outside diameter of the plunger member 78 is set so that any portion on the seal surface 85 of the plunger member 78 keeps a clearance of 0 mm or larger between the seal surface 85 and the inner peripheral surface of the cylinder chamber 76 in the state in which the plunger member 78 tilts at the maximum tilt angle $\theta_{MAX}$. Therefore, when the plunger member 78 tilts at the maximum tilt angle $\theta_{MAX}$ with respect to the axis S, a state in which the inner peripheral surface of the shaft accommodating hole 84 in the plunger member 78 comes into contact with the outer peripheral surface of the guide rod 120 is formed.

However, the clearance of 0 mm or larger is kept between any portion on the seal surface 85 of the plunger member 78 and the inner peripheral surface of the cylinder chamber 76, so that the contact of the outer peripheral surface of the plunger member 78 with the inner peripheral surface of the cylinder chamber 76 in a pressurized state is prevented.

If the outer peripheral surface of the plunger member 78 comes into contact with the inner peripheral surface of the cylinder chamber 76 in a pressurized state, the contact area is large as compared with the contact area between the inner peripheral surface of the shaft accommodating hole 84 and the outer peripheral surface of the guide rod 120, so that the frictional resistance is also relatively large. However, even if the inner peripheral surface of the shaft accommodating hole 84 comes into contact with the outer peripheral surface of the guide rod 120 in a pressurized state, the contact area is relatively small, and moreover the ceramic layer 121 capable of reducing the friction against the inner peripheral surface of the shaft accommodating hole 84 is formed on the surface of the guide rod 120. Therefore, the frictional resistance between the inner peripheral surface of the shaft accommodating hole 84 and the outer peripheral surface of the guide rod 120 is relatively small.

As the result, according to the vibration isolator 10, even when the plunger member 78 tilts with respect to the axis S, the development of frictional resistance between the outer peripheral surface of the plunger member 78 and the inner peripheral surface of the cylinder chamber 76 is prevented substantially, and the increase in movement resistance of the plunger member 78 along the axial direction can be restrained effectively. Therefore, the plunger member 78 can be prevented from not moving normally to a position corresponding to the frequency of input vibrations (opening position or closing position).

In the vibration isolator 10 in accordance with this embodiment, the shaft accommodating hole 84 is provided in the plunger member 78, and the guide rod 120 is provided on the holder member 100 of the partitioning member 36. Contrarily, however, the configuration can be such that the shaft accommodating hole is provided in the partitioning member 36, and the guide rod is provided on the plunger member 78. In this case as well, when the maximum tilt angle of the plunger member 78 with respect to the axial direction, which is calculated according to a difference between the inside diameter of the shaft accommodating hole and the outside diameter of the guide rod, is taken as $\theta_{MAX}$, the difference $D_{MIN}$ between the inside diameter of the cylinder chamber 76 and the outside diameter of the seal surface 85 of the plunger member 78 is set so that any portion on the seal surface 85 keeps a clearance of 0 mm or larger between the seal surface 85 and the inner peripheral surface of the cylinder chamber 76 in the state in which the plunger member 78 tilts at the maximum tilt angle $\theta_{MAX}$. Thereby, the development of frictional resistance between the outer peripheral surface of the plunger member 78 and the inner peripheral surface of the cylinder chamber 76 is prevented substantially, and the increase in movement resistance of the plunger member 78 along the axial direction can be restrained effectively.

Also, in the vibration isolator 10, the ceramic layer 121 is formed on the surface of the guide rod 120 only. However, in place of the formation of the ceramic layer 121 on the surface of the guide rod 120, the ceramic layer 121 may be formed on the inner peripheral surface of the shaft accommodating hole 84, or may be formed on both of the surface of the guide rod 120 and the inner peripheral surface of the shaft accommodating hole 84.

In this case as well, the movement resistance of the plunger member 78 can be reduced, and also wear on the surface of the guide rod 120 on which the ceramic layer 121 is formed or the inner peripheral surface of the shaft accommodating hole 84 can be restrained effectively.

In this embodiment, a silicon nitride based ceramic having especially excellent in-fluid lubricity is used as the material for the ceramic layer 121. However, even if the ceramic layer 121 is formed by using a high-strength zirconia based ceramic having high surface smoothness as a raw material, or a portion including at least the outer peripheral surface of the guide rod 120 and a portion including at least the inner peripheral surface of the shaft accommodating hole 84 are formed by this ceramic, both of high-level lubricity and wear resistance can be obtained as compared with the case where any other metal material, a resin material, or the like is used.

Further, in the vibration isolator 10, the seat receiving protrusion 86 is formed on the lower surface side of the plunger member 78, and the seat receiving protrusion 86 is fittedly inserted on the inner periphery side of the upper end part including the upper-side end turn part 140 of the coil spring 90, and also the circular concave receiving seat 56 is formed on the upper surface side of the bottom plate part 50 of the orifice member 46, and the lower end part including the lower-side end turn part 136 of the coil spring 90 is fitted inserted in the receiving seat 56. Thereby, the upper-side end turn part 140 and the lower-side end turn part 136 of the coil spring 90 can be positioned accurately at the assembly position coaxial with the axis S by the seat receiving protrusion 86 and the receiving seat 56, respectively, and also even if the transverse force is generated by repeating deformation of the coil spring 90 in the compression and tension directions at the vibration input time, the whole of the coil spring 90 can be prevented from moving in the direction perpendicular to the axis and being displaced from the assembly position. Further, the coil spring 90 can be prevented from being tilted by relative displacement of one of the end turn parts 136 and 140 of the coil spring 90 with respect to the other of the end turn parts 136 and 140 in the direction perpendicular to the axis.

Figure 9:
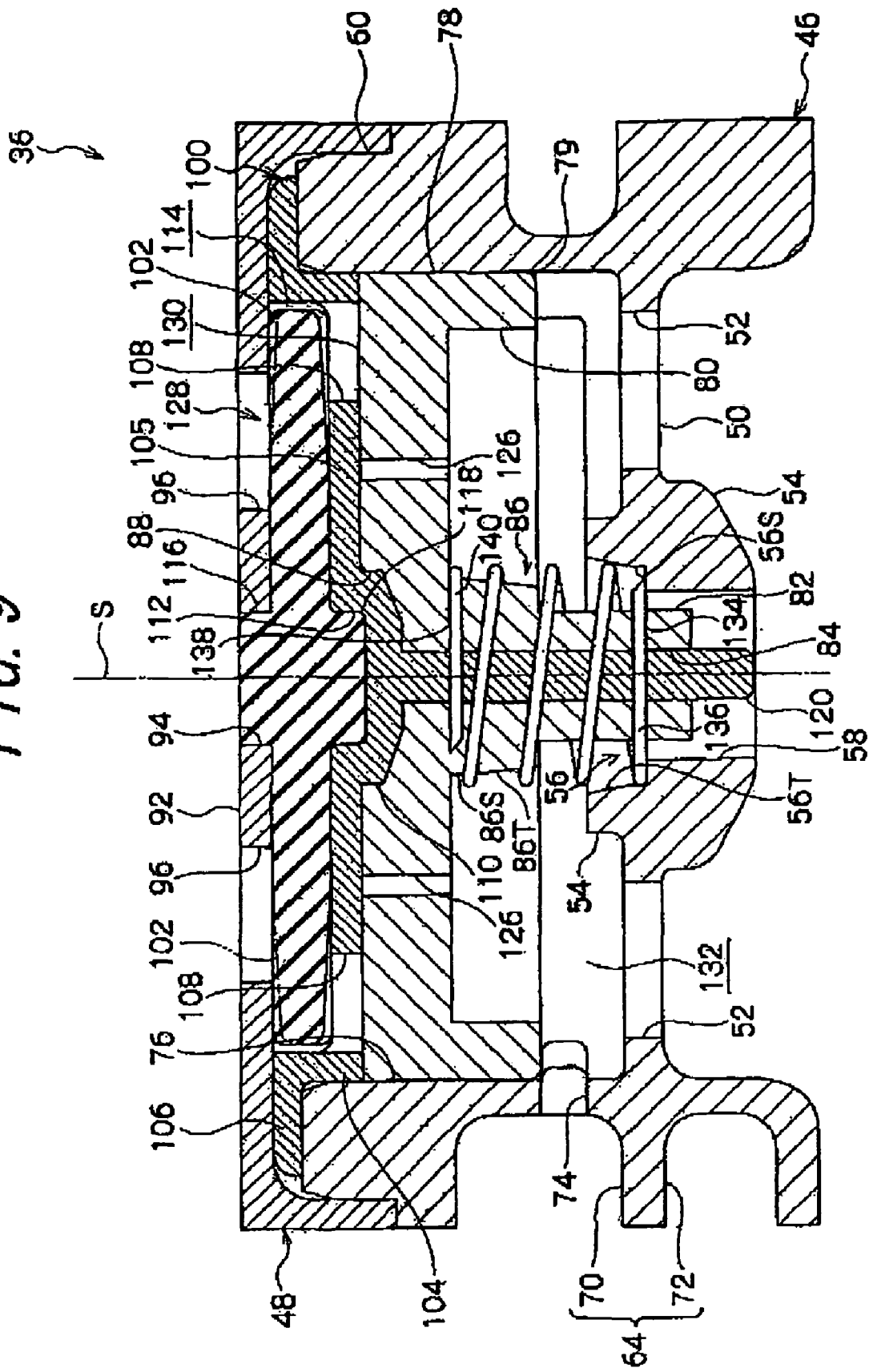
FIG. 9 is a sectional view showing modifications of a seat receiving protrusion and a receiving seat, the view being similar to FIGS. 3 and 4.

FIG. 9 shows a configuration of a partitioning member provided with modifications of the seat receiving protrusion and receiving seat capable of being applied to the above-described vibration isolator.

In the vibration isolator 10, in the case where the coil spring 90 is used to urge the plunger member 78 to the opening position side, the problems as described below may occur.

The coil spring 90 may exhibit a phenomenon that the center axis thereof is curved (zigzagged) at the time of compressive deformation. The zigzag of the coil spring 90 does not exert a great influence on the characteristics such as a spring constant of the coil spring 90 itself in a predetermined range of zigzag amount. Generally, the coil spring 90 is used under the condition that the zigzag amount is in the predetermined range. However, in the case where zigzag occurs on the coil spring 90, and the upper end part or the lower end part of the coil spring 90 is pressingly brought into local contact with the outer peripheral surface of the seat receiving protrusion or the inner peripheral surface of the receiving seat, smooth deformation of the upper end part and the lower end part of the coil spring 90 is inhibited, and frictional noise may be generated.

Thereupon, a seat receiving protrusion 86 shown in FIG. 9 is formed with a taper part 86T, the outside diameter of which decreases gradually from a base end part 86S toward the tip end of the seat receiving protrusion 86, in a portion on the tip end side of the base end part 86S positioned on the inner periphery side of the upper-side end turn part 140.

Thereby, a clearance, the width of which increases gradually from the base end part 86S of the seat receiving protrusion 86 toward the tip end thereof, is formed between the inner peripheral end of a wire part forming the upper end part of the coil spring 90 and the outer peripheral surface of the seat receiving protrusion 86. Therefore, even if zigzag occurs near the upper end of the coil spring 90, the upper end part of the coil spring 90 can be prevented effectively from being pressingly brought into contact with the outer peripheral surface of the seat receiving protrusion 86.

Also, the receiving seat 56 shown in FIG. 9 is formed with a taper part 56T, the inside diameter of which increases gradually along the radial direction from a far-side end part 56S toward the opening end, in a portion on the opening end side of the far-side end part 56S positioned on the outer periphery side of the lower-side end turn part 136.

Thereby, a clearance, the width of which along the radial direction increase gradually from the far-side end part 54S of the seat receiving hole 56 toward the opening end, is formed between the outer peripheral end of the wire part forming the lower end part of the coil spring 90 and the inner peripheral surface of the seat receiving hole 56. Therefore, even if zigzag occurs near the lower end of the coil spring 90, the lower end part of the coil spring 90 can be prevented effectively from being pressingly brought into contact with the inner peripheral surface of the seat receiving protrusion 86.

In the vibration isolator 10 in accordance with this embodiment, the plunger member 78 is provided with the column-shaped seat receiving protrusion 86, and the orifice member 46 is provided with the circular concave receiving seat 56. Contrarily, however, the configuration may be such that the plunger member 78 is provided with a receiving seat so that the upper end part of the coil spring is fittedly inserted in this receiving seat, and the orifice member 46 is provided with a seat receiving protrusion so that this seat receiving protrusion is fittedly inserted in the lower end of the coil spring 90.

Also, one of the seat receiving protrusion and the seat receiving hole may be provided on both of the orifice member 46 and the plunger member 78.

In the vibration isolator 10 described above, one of the two orifices (a first restriction passage and a second restriction passage) is used as the shake orifice 122 corresponding to shake vibrations, and the other thereof is used as the idle orifice 124 corresponding to idle vibrations. However, the two first and second restriction passages need not necessarily be caused to correspond to shake vibrations and idle vibrations. The configuration may be such that the first restriction passage corresponds to vibrations in a relatively low frequency zone, and the second restriction passage corresponds to vibrations in a relatively high frequency zone.

Also, in the vibration isolator 10 described above, the lengthwise direction of the orifice opening 74 coincides with the circumferential direction with the axis S being the center. However, the configuration may be such that the lengthwise direction of the orifice opening 74 is tilted with respect to the circumferential direction with the axis S being the center, and also the direction in which the edge part 79 of the plunger member 78 extends is tilted with respect to the circumferential direction and is caused to coincide with the lengthwise direction of the orifice opening 74 tilted with respect to the circumferential direction.

Also, the vibration isolator 10 in accordance with the present invention is configured so that the attaching member 20 is connected to the engine side, and the external cylinder member 12 is connected to the vehicle body side. Contrarily, however, the configuration may be such that the attaching member 20 is connected to the vehicle body side, and the external cylinder member 12 is connected to the engine side.

In the vibration isolator 10 described above, the fluid is supplied from the main fluid chamber 42 into the pressurization space 130 through the check valve 128 when the fluid pressure in the main fluid chamber 42 rises, and the fluid pressure in the pressurization space 130 is raised to the equilibrium pressure corresponding to the upper limit value of fluid pressure in the main fluid chamber 42, by which the plunger member 78 is moved from the opening position to the closing position by the fluid pressure (positive pressure) in the pressurization space 130 at the time of input of shake vibrations. Contrarily, however, the configuration may be such that the check valve is configured so that the fluid can be caused to flow out only from the pressurization space 130 into the main fluid chamber 42, and by causing the fluid to flow out from the pressurization space 130 into the main fluid chamber 42 through the check valve when the fluid pressure in the main fluid chamber 42 decreases, the fluid pressure in the pressurization space 130 is reduced to the equilibrium pressure corresponding to the lower limit value of fluid pressure in the main fluid chamber 42, by which the plunger member 78 is moved from the opening position to the closing position by the fluid pressure (negative pressure) in the pressurization space 130 at the time of input of shake vibrations.

In this case, the vibration isolator 10 is configured so that when the plunger member 78 is urged downward along the axial direction by the coil spring 90, the orifice opening 74 is opened in the state in which the plunger member 78 is at the lower limit position (opening position), and thereby the plunger member 78 is raised from the lower limit position to the upper limit position (closing position) against the urging force of the coil spring 90 by the action of the negative pressure in the liquid pressure space 130.

Figure 10:
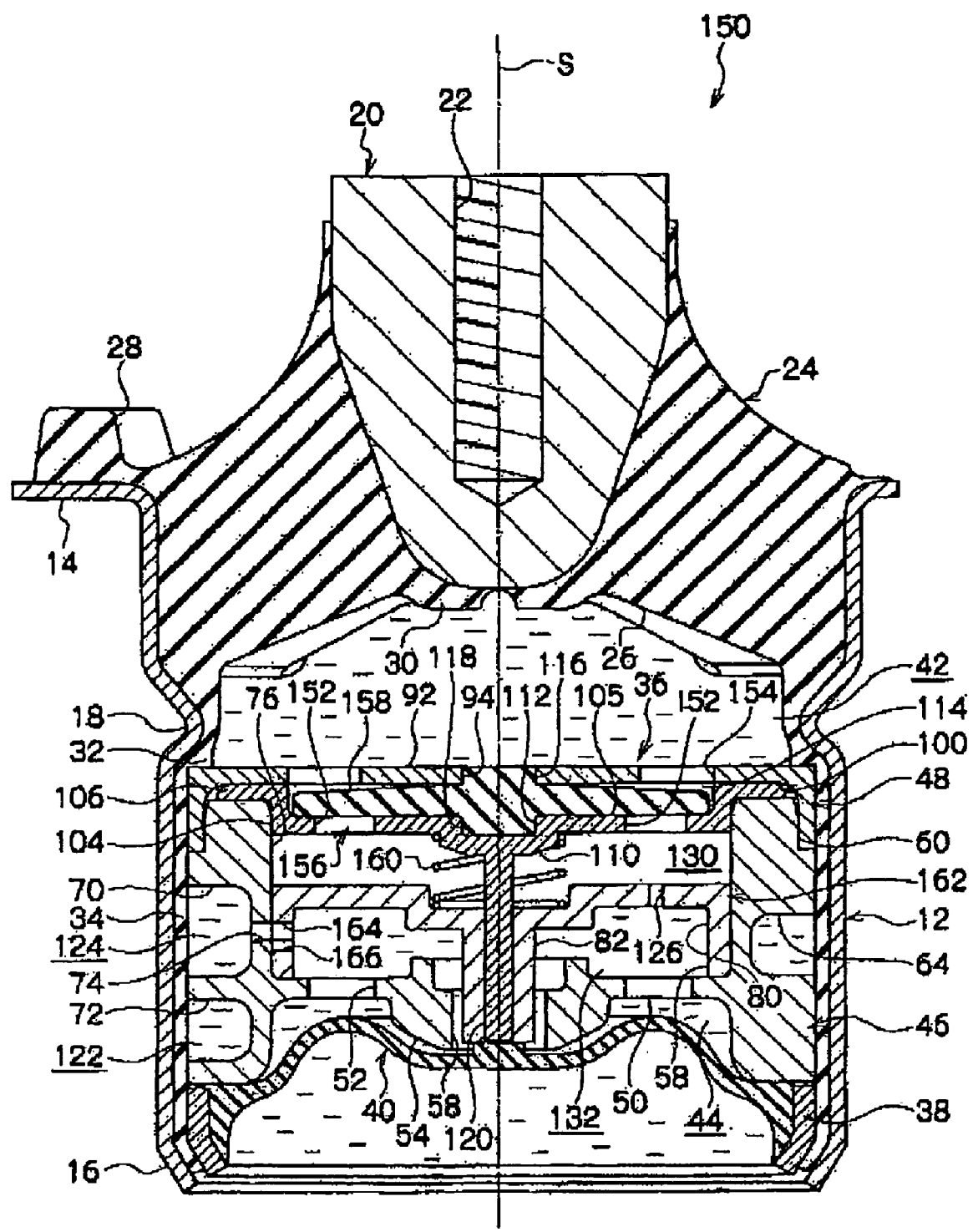
FIG. 10 is a sectional view along the axial direction showing a configuration of a vibration isolator in accordance with another embodiment, showing a state in which a plunger member is at an opening position.

FIG. 10 is a longitudinal sectional view showing another embodiment of a vibration isolator in accordance with the present invention, which can be caused to function as described above.

In a vibration isolator 150 in accordance with this embodiment, the same reference numerals are applied to elements that are the same as those of the above-described vibration isolator 10, and the explanation thereof is omitted.

The vibration isolator 150 in accordance with this embodiment differs from the vibration isolator 10 in that a valve seat opening 152 is formed in the bottom plate part 105 of the holder member 100, and a flow opening 154 is formed in the top plate part 92 of the lid member 48, and also a valve element 158 constituting a check valve 156 together with the lid member 48 and the holder member 100 is accommodated in the valve element accommodating chamber 114 in the state of being overturned up and down so as to pressingly come into contact with the bottom plate part 105.

Further, in the vibration isolator 150, a coil spring 160 in a compressed state is interposed between the bottom plate part 105 and a plunger member 162, and the coil spring 160 always urge the plunger member 162 downward (in this embodiment, to the opening position side).

The plunger member 162 is formed with a plunger opening 164 penetrating from the outer peripheral surface thereof to the inner peripheral surface of the annular concave part 80. When the plunger opening 164 is at the opening position at which the plunger member 162 is in contact with the bottom plate part 50 of the orifice member 46, the plunger opening 164 is held at the same position as the orifice opening 74 to cause the common orifice part 70 to communicate with the orifice space 132 together with the orifice opening 74.

On the other hand, when the plunger member 162 moves from the opening position shown in FIG. 10 to the closed state which is the compression limit of the coil spring 160, the orifice opening 74 is closed by the outer peripheral surface of the plunger member 162.

In the vibration isolator 150, the plunger member 162 is provided with an auxiliary opening 166 formed by cutting a part of the lower end side of the inner peripheral surface of the plunger opening 164 into a U shape. Such an auxiliary opening may be formed on the orifice member 46 side by cutting a part of the upper end side of the inner peripheral surface of the orifice opening 74.

Next, the operation of the vibration isolator 150 is explained.

In the vibration isolator 150, when the liquid pressure in the main fluid chamber 42 becomes a negative pressure with respect to the fluid pressure in the pressurization space 130 (the sub-fluid chamber 44), the valve element 158 opens the valve seat opening 152. When the liquid pressure in the main fluid chamber 42 becomes almost equal to the fluid pressure in the pressurization space 130 or a positive pressure, the valve element 158 closes the valve seat opening 152. Thereby, the fluid pressure in the pressurization space 130 is reduced to a pressure in equilibrium with the lower limit value of fluid pressure in the main fluid chamber 42 at the vibration input time.

Therefore, in the vibration isolator 150, in the case where shake vibrations having a relatively low frequency and large amplitude are input, the rubber elastic body 24 is elastically deformed by the shake vibrations, so that a relatively large change in fluid pressure occurs in the main fluid chamber 42, and the fluid flows out from the pressurization space 130 into the main fluid chamber 42 through the check valve 156 when the fluid pressure in the main fluid chamber 42 lowers periodically. Therefore, the fluid pressure in the pressurization space 130 also lowers to the equilibrium pressure substantially in equilibrium with the fluid pressure at the rise time in the main fluid chamber 42.

In the vibration isolator 150 as well, the urging force of the coil spring 160 is set so as to be smaller than a value corresponding to the fluid pressure (equilibrium pressure) in the pressurization space 130 at the time of input of shake vibrations. Thereby, at the time of input of shake vibrations, the plunger member 162 moves intermittently from the opening position to the closing position side against the urging force of the coil spring 160, and is held at the closing position by the fluid pressure (negative pressure) in the pressurization space 130.

Therefore, in the vibration isolator 150, at the time of input of shake vibrations, the fluid flows back and forth between the main fluid chamber 42 and the sub-fluid chamber 44 through the shake orifice 122 only along with the elastic deformation of the rubber elastic body 24. Therefore, the input vibrations (low-frequency zone vibrations) can be absorbed, so that the shake vibrations transmitted from the engine side to the vehicle body side can be reduced.

Also, in the vibration isolator 150, in the case where idle vibrations having a relatively high frequency and small amplitude are input, the rubber elastic body 24 is elastically deformed by the idle vibrations, and also a relatively small fluid pressure change occurs in the main fluid chamber 42. Therefore, in this case as well, the fluid flows out from the pressurization space 130 to the main fluid chamber 42 through the check valve formed by the valve element 158 and the like when the fluid pressure in the main fluid chamber 42 rises periodically, so that the fluid pressure in the pressurization space 130 lowers and reaches to the equilibrium pressure substantially in equilibrium with the fluid pressure (lower limit value) at the rise time in the main fluid chamber 42.

However, in the vibration isolator 150, the urging force of the coil spring 160 is set so as to be larger than a value corresponding to the equilibrium pressure in the pressurization space 130 at the time of input of idle vibrations. Thereby, when the plunger member 162 is at the opening position, the plunger member 162 is held at the opening position by the urging force of the coil spring 160. Also, when the plunger member 162 is at the closing position, the plunger member 162 is moved (returned) from the closing position to the opening position by the urging force of the coil spring 160.

Therefore, in the vibration isolator 150, at the time of input of idle vibrations, the fluid flows back and forth between the main fluid chamber 42 and the sub-fluid chamber 44 preferentially passing through the idle orifice 124 having fluid flow resistance smaller than that in the shake orifice 122 along with the elastic deformation of the rubber elastic body 24, so that the idle vibrations transmitted from the engine side to the vehicle body side can be reduced.

As the result, according to the vibration isolator 150 in accordance with this embodiment as well, the orifice that causes the main fluid chamber 42 and the sub-fluid chamber 44 to communicate with each other can be changed over to either one of the shake orifice 122 and the idle orifice 124 according to the frequency of input vibrations by using the fluid pressure change in the main fluid chamber 42 as a driving force without the use of a valve mechanism that is operated by receiving control from the outside using an electromagnetic solenoid, a pneumatic solenoid, or the like and power supply.

In the vibration isolator 150 in accordance with this embodiment, one of the two orifices (the first restriction passage and the second restriction passage) is used as the shake orifice 122 corresponding to shake vibrations, and the other thereof is used as the idle orifice 124 corresponding to idle vibrations. However, in this isolator as well, the two first and second restriction passages need not necessarily be caused to correspond to shake vibrations and idle vibrations. The configuration may be such that the first restriction passage corresponds to vibrations in a relatively low frequency zone, and the second restriction passage corresponds to vibrations in a relatively high frequency zone.

Also, the vibration isolator 150 is configured so that the attaching member 20 is connected to the engine side, and the external cylinder member 12 is connected to the vehicle body side. Contrarily, however, the configuration may be such that the attaching member 20 is connected to the vehicle body side, and the external cylinder member 12 is connected to the engine side.

The invention claimed is:

1. A vibration isolator comprising:
    a first attaching member connected to one of a vibration-producing part and a vibration-receiving part;
    a second attaching member connected to the other of the vibration-producing part and the vibration-receiving part;
    an elastic body arranged between the first attaching member and the second attaching member;
    a main fluid chamber which is filled with a fluid with the elastic body being used as a part of partition and the internal volume of which changes along with the elastic deformation of the elastic body;
    a sub-fluid chamber which is filled with the fluid and the internal volume of which is capable of increasing and decreasing;
    a first restriction passage which causes the main fluid chamber and the sub-fluid chamber to communicate with each other;
    a second restriction passage which causes the main fluid chamber and the sub-fluid chamber to communicate with each other and has fluid flow resistance smaller than that of the first restriction passage,
    wherein a part on the main fluid chamber side of the first restriction passage is formed as a common orifice part forming a part of the second restriction passage;
    a cylinder chamber which is provided between the main fluid chamber and the sub-fluid chamber and is filled with the fluid;
    a plunger member which divides the cylinder chamber into an orifice space which forms a part of the second restriction passage and communicates with the sub-fluid chamber and a pressurization space isolated from the second restriction passage, and is capable of moving between a predetermined opening position and closing position along the expanding/contracting direction of the orifice space and the pressurization space;
    an orifice opening which is provided so as to face to the orifice space to cause the orifice space to communicate with the second restriction passage;
    an urging member for urging the plunger member to the opening position side to decrease the pressurization space;
    a fluid pressure releasing path for allowing the fluid in the pressurization space to flow out into the orifice space or the sub-fluid chamber when the plunger member is returned to the opening position by the urging force of the urging member;
    a check valve which is arranged between the main fluid chamber and the pressurization space and is capable of allowing the fluid to flow out only in one direction between the main fluid chamber and the pressurization space along with a fluid pressure change in the main fluid chamber;
    a shaft accommodating hole provided in the plunger member so as to penetrate in the expanding/contracting direction; and
    a holder member for a valve element of the check valve, which is provided with a guide shaft inserted in the shaft accommodating hole so as to be relatively slidable,
    the width of a first opening along the opening longitudinal direction of the orifice opening in parallel with the expanding/contracting direction being set so as to be narrower than the width of a second opening along the opening transverse direction intersecting with the opening longitudinal direction,
    the plunger member closing the orifice opening when being moved to the closing position against the urging force of the urging member by the fluid pressure in the pressurization space, and opens the orifice opening when being returned to the opening position by the urging force of the urging member, and
    when the maximum tilt angle of the plunger member with respect to the expanding/contracting direction, which is calculated according to a difference between the inside diameter of the shaft accommodating hole and the outside diameter of the guide shaft, is taken as qMAX, a difference DMIN between the inside diameter of the cylinder chamber and the outside diameter of the plunger member is set so that any portion on the outer peripheral surface of the plunger member keeps a clearance of 0 mm or larger between the outer peripheral surface of the plunger member and the inner peripheral surface of the cylinder chamber in a state in which the plunger member tilts at the maximum tilt angle qMAX.

2. The vibration isolator according to claim 1, wherein an edge part of the outer peripheral surface of the plunger member, which is close to the closing position along the expanding/contracting direction, extends substantially in parallel with the opening transverse direction in a state in which the plunger member is at the opening position.

3. The vibration isolator according to claim 1, wherein the fluid flow resistance in the orifice opening is smaller than the fluid flow resistance in an upstream-side portion and a downstream-side portion of the orifice opening of the second restriction passage.

4. The vibration isolator according to claim 1, wherein the orifice opening communicating with the orifice space is formed in the boundary part between the common orifice part and a dedicated orifice part, which is another part of the first restriction passage.

5. The vibration isolator according to claim 4, wherein a cross-sectional area of the common orifice part in the first restriction passage is equal to or larger than a cross-sectional area of the dedicated orifice part.

6. The vibration isolator according to claim 4, wherein the fluid flow resistance in the orifice opening is smaller than the fluid flow resistance in the common orifice part.

7. The vibration isolator according to claim 4, wherein the cylinder chamber is provided on the inner periphery side of the first restriction passage in the partitioning member.

8. The vibration isolator according to claim 1, wherein
the vibration isolator further comprises a coil spring for urging the plunger member to the opening position side on which the pressurization space is decreased; and a receiving part which engages with at least one end turn part of the coil spring to restrict the movement of the end turn part along the radial direction, and
the plunger member closes the orifice opening when being moved to the closing position against the urging force of the coil spring by the fluid pressure in the pressurization space, and opens the orifice opening when being returned to the opening position by the urging force of the coil spring.

9. The vibration isolator according to claim 2, wherein the fluid flow resistance in the orifice opening is smaller than the fluid flow resistance in an upstream-side portion and a downstream-side portion of the orifice opening of the second restriction passage.

10. The vibration isolator according to claim 5, wherein the fluid flow resistance in the orifice opening is smaller than the fluid flow resistance in the common orifice part.

11. The vibration isolator according to claim 5, wherein the cylinder chamber is provided on the inner periphery side of the first restriction passage in the partitioning member.

12. The vibration isolator according to claim 6, wherein the cylinder chamber is provided on the inner periphery side of the first restriction passage in the partitioning member.

13. The vibration isolator according to claim 10, wherein the cylinder chamber is provided on the inner periphery side of the first restriction passage in the partitioning member.

* * * * *